United States Patent
Li et al.

(10) Patent No.: US 10,114,134 B2
(45) Date of Patent: Oct. 30, 2018

(54) SYSTEMS AND METHODS FOR GENERATING A GEOLOGICAL MODEL HONORING HORIZONS AND FAULTS

(75) Inventors: Wan-Chiu Li, Nancy (FR); Laurent Deny, Houston, TX (US); Olivier Grosse, Vandoeuvre-les-Nancy (FR); Jean-Claude Dulac, Sugarland, TX (US)

(73) Assignee: Emerson Paradigm Holding LLC, Houston, TX (US)

( * ) Notice: Subject to any disclaimer, the term of this patent is extended or adjusted under 35 U.S.C. 154(b) by 1011 days.

(21) Appl. No.: 13/458,264

(22) Filed: Apr. 27, 2012

(65) Prior Publication Data

US 2013/0231903 A1 Sep. 5, 2013

Related U.S. Application Data

(60) Provisional application No. 61/605,866, filed on Mar. 2, 2012.

(51) Int. Cl.
*G06G 7/48* (2006.01)
*G01V 1/32* (2006.01)
*G01V 99/00* (2009.01)

(52) U.S. Cl.
CPC ............ *G01V 1/325* (2013.01); *G01V 99/005* (2013.01); *G01V 2210/64* (2013.01);
(Continued)

(58) Field of Classification Search
CPC ........... G06T 17/20; G06T 17/05; G06G 7/50; G01V 11/00
(Continued)

(56) References Cited

U.S. PATENT DOCUMENTS

| | | | |
|---|---|---|---|
| 4,964,099 A | 10/1990 | Carron | |
| 4,991,095 A | 2/1991 | Swanson | |

(Continued)

FOREIGN PATENT DOCUMENTS

| | | |
|---|---|---|
| AU | 2002329615 | 7/2002 |
| CA | 2 455 810 | 7/2005 |

(Continued)

OTHER PUBLICATIONS

Gringarten, E., New Grids for Robust Reservoir Modeling, SPE 116649, 2008.*

(Continued)

*Primary Examiner* — Aniss Chad
*Assistant Examiner* — Brian S Cook
(74) *Attorney, Agent, or Firm* — Pearl Cohen Zedek Latzer Baratz LLP

(57) ABSTRACT

A system and method for modeling a subsurface structure. Data representing a configuration of faults, horizons, and/or unconformities may be transformed to a depositional model comprising cells representing an estimated configuration of subsurface structure at a depositional time period when the subsurface structure was formed. Groups of cells in the depositional model may be divided into sub-meshes using iso-surfaces, where one set of iso-surfaces may represent the horizons at the depositional time period. The sub-meshes may be divided into one or more parts using the transformed geological data representing an estimated depositional configuration of the faults. For each group of cells in each sub-mesh part, the group of cells in the sub-mesh part may be represented by a single polyhedron. The polyhedrons may be transformed to generate a current model to represent the current configuration of the faults and horizons using transformed polyhedrons.

22 Claims, 17 Drawing Sheets

(52) U.S. Cl.
CPC .. *G01V 2210/642* (2013.01); *G01V 2210/646* (2013.01); *G01V 2210/661* (2013.01)

(58) Field of Classification Search
USPC ......... 703/1, 2, 10, 16, 14, 9; 345/420, 419; 367/72
See application file for complete search history.

(56) References Cited

U.S. PATENT DOCUMENTS

| | | | |
|---|---|---|---|
| 5,465,323 A | 11/1995 | Mallet | |
| 5,475,589 A | 12/1995 | Armitage | |
| 5,586,082 A | 12/1996 | Anderson et al. | |
| 5,844,799 A | 12/1998 | Joseph et al. | |
| 5,995,907 A | 11/1999 | Van Bemmel et al. | |
| 6,018,498 A | 1/2000 | Neff et al. | |
| 6,106,561 A * | 8/2000 | Farmer | G01V 1/282 345/423 |
| 6,138,076 A | 10/2000 | Graf et al. | |
| 6,151,555 A | 11/2000 | Van Bemmel et al. | |
| 6,246,963 B1 | 6/2001 | Cross et al. | |
| 6,256,599 B1 * | 7/2001 | Tiribuzi | G06T 11/206 703/2 |
| 6,278,949 B1 | 8/2001 | Alam | |
| 6,353,577 B1 | 3/2002 | Orban et al. | |
| 6,597,995 B1 | 7/2003 | Cornu et al. | |
| 6,725,174 B2 | 4/2004 | Bouts et al. | |
| 6,771,800 B2 | 8/2004 | Keskes et al. | |
| 6,778,909 B1 | 8/2004 | Popovici et al. | |
| 6,791,900 B2 | 9/2004 | Gillard et al. | |
| 6,820,043 B2 | 11/2004 | Mallet et al. | |
| 6,847,737 B1 | 1/2005 | Kouri et al. | |
| 6,850,845 B2 | 2/2005 | Stark | |
| 6,889,142 B2 | 5/2005 | Schonewille | |
| 6,904,169 B2 | 6/2005 | Kalevo et al. | |
| 7,024,021 B2 | 4/2006 | Dunn et al. | |
| 7,089,166 B2 | 8/2006 | Malthe-Sorenssen et al. | |
| 7,126,340 B1 | 10/2006 | Ameen et al. | |
| 7,187,794 B2 | 3/2007 | Liang et al. | |
| 7,227,983 B1 | 6/2007 | Christian et al. | |
| 7,248,539 B2 | 7/2007 | Borgos et al. | |
| 7,280,918 B2 | 10/2007 | Williams | |
| 7,412,363 B2 | 8/2008 | Callegari | |
| 7,418,149 B2 | 8/2008 | Dinh et al. | |
| 7,446,765 B2 | 11/2008 | Dugge | |
| 7,480,205 B2 | 1/2009 | Wei et al. | |
| 7,523,024 B2 | 4/2009 | Endres et al. | |
| 7,561,992 B2 | 7/2009 | Leflon et al. | |
| 7,660,481 B2 | 2/2010 | Schaap et al. | |
| 7,711,532 B2 | 5/2010 | Dulac et al. | |
| 7,742,875 B2 | 6/2010 | Li et al. | |
| 7,744,534 B2 | 6/2010 | Chalana et al. | |
| 7,844,402 B2 | 11/2010 | Klein et al. | |
| 8,010,294 B2 | 8/2011 | Dorn et al. | |
| 8,065,088 B2 | 11/2011 | Dorn et al. | |
| 8,150,663 B2 | 4/2012 | Mallet | |
| 8,274,859 B2 | 9/2012 | Maucec et al. | |
| 8,600,708 B1 * | 12/2013 | Mallet | G06T 17/05 703/2 |
| 8,635,052 B1 | 1/2014 | Mallet et al. | |
| 8,743,115 B1 * | 6/2014 | Mallet | G01V 1/302 345/419 |
| 2001/0036294 A1 | 11/2001 | Keskes et al. | |
| 2002/0032550 A1 | 3/2002 | Ward et al. | |
| 2003/0023383 A1 | 1/2003 | Stark et al. | |
| 2003/0216897 A1 | 11/2003 | Endres et al. | |
| 2004/0260476 A1 | 12/2004 | Borgos et al. | |
| 2004/0267454 A1 | 12/2004 | Granjeon | |
| 2005/0114831 A1 | 5/2005 | Callegari et al. | |
| 2005/0216197 A1 | 9/2005 | Zamora et al. | |
| 2006/0004522 A1 | 1/2006 | Cacas | |
| 2007/0024623 A1 | 2/2007 | Dugge | |
| 2008/0021684 A1 * | 1/2008 | Dulac et al. | 703/9 |
| 2008/0243447 A1 | 10/2008 | Roggero et al. | |
| 2008/0273421 A1 | 11/2008 | Koren et al. | |
| 2009/0122060 A1 | 5/2009 | Porat et al. | |
| 2010/0156920 A1 | 6/2010 | Shin et al. | |
| 2011/0015910 A1 | 1/2011 | Ran et al. | |
| 2011/0054857 A1 | 3/2011 | Moguchaya | |
| 2011/0106507 A1 * | 5/2011 | Lepage | G01V 11/00 703/2 |
| 2011/0115787 A1 | 5/2011 | Kadlec | |
| 2012/0037379 A1 | 2/2012 | Hilliard et al. | |
| 2012/0072116 A1 | 3/2012 | Dorn et al. | |
| 2013/0204598 A1 | 8/2013 | Mallet | |
| 2013/0211796 A1 * | 8/2013 | Aquelet | 703/2 |
| 2013/0262052 A1 | 10/2013 | Mallet et al. | |

FOREIGN PATENT DOCUMENTS

| | | |
|---|---|---|
| GB | 2444506 | 6/2008 |
| GB | 2444167 | 3/2011 |
| RU | 2145100 | 1/2000 |
| WO | WO 03/009003 | 1/2003 |
| WO | WO 03/050766 | 6/2003 |
| WO | WO 06/007466 | 1/2006 |
| WO | WO 08/005690 | 1/2008 |

OTHER PUBLICATIONS

Moyen, R., 3D-Parameterization of the 3D Geological Space—The Geochron Model, 9th European Conference on the Mathematics of Oil Recovery—Cannes, France, Aug. 30-Sep. 2, 2004.*
Cell: The Random House College Dictionary Revised Edition, 1982.*
Durlofsky, L.J., Upscaling and Gridding of Fine Scale Geological Models for Flow Simulation, 8th International Forum on Reservoir Simulation Iles Borromees, Stresa, Italy, Jun. 20-24, 2005.*
Prevost, M., Unstructured 3D Gridding and Upscaling for Coarse Modeling of Geometrically Complex Reservoirs, 9$^{th}$ European Conference on the Mathematics of Oil Recovery—Cannes, France, Aug. 30-Sep. 2, 2004.*
Voller, V.R., Basic Control Volume Finite Element Methods for Fluid and Solids, IISc Research Monographs Series, 2009.*
Oil-Gas SKUA—A Step Change in Modeling, 3D Modeling, Scandinavian Oil—Gas Magazine No. 9/10 2008.*
(The Computer Mouse and Related Input Devices, Manuscript Version 6. Official copy "Mouse" in Berkshire Encyclopedia of Human-Computer Interaction, W.S. Bainbridge (ed). 2004.*
Durlofsky, L.J., Upscaling and Gridding of Fine Scale Geological Models for Flow Simulation, 8th International Forum on Reservoir Simulation Iles Borromees, Stress, Italy, Jun. 20-24, 2005.*
Hasle_2007 (Geometric Modelling, Numerical Simulation, and Optimization: Applied Mathematics at SINTEF, Springer 2007).*
Hauge, V.L., Lie, K.-A., Natvig, J.R.: Flow-based grid coarsening for transport simulations. In: Proceedings of ECMOR XII—12th European Conference on the Mathematics of Oil Recovery (EAGE), Oxford, UK, Sep. 6-9, 2010.*
Gringarten_2008 New Grids for Robust Reservoir Design, Society of Petroleum Engineers 2008.*
Hasle_2007 Geometric Modelling Numerical Simulation and Optimization: Applied Mathematics at SINTEF, Spriner 2007.*
U.S. Appl. No. 12/795,494, filed Jun. 7, 2010, Mallet et al.
U.S. Appl. No. 12/909,981, filed Oct. 22, 2010, Mallet et al.
U.S. Appl. No. 12/791,352, filed Jun. 1, 2010, Mallet et al.
U.S. Appl. No. 12/791,483, filed Jun. 1, 2010, Tertois et al.
Bakker, "Image Structure Analysis for Seismic Interpretation," doctoral thesis, publicly defended on Jun. 4, 2002.
Carr et al., "Reconstruction and Representation of 3D Objects with Radial Basis Functions," ACM SIGGRAPH 2001, ACM Press New York, Computer Graphics Proceedings, pp. 67-76, 2001 (ISBN 1-58113-374-X).
Caumon et al. "Building and Editing a Sealed Geological Model," Mathematical Geology, vol. 36, No. 4, May 2004; pp. 405-424.
Caumon et al., "Elements for Stochastic Structural Perturbation of Stratigraphic Models," Proc. Petroleum Geostatistics, Sep. 10-14, 2007.

(56) References Cited

OTHER PUBLICATIONS

Chiles et al., "Modelling the Geometry of Geological Units and its Uncertainty in 3D From Structural Data: The Potential-Field Method," Orebody Modelling and Strategic Mine Planning, pp. 313-320, Nov. 22-24, 2004.

Cignoni et al., "Multiresolution Representation and Visualization of Volume Data," IEEE Transactions on Visualizations and Computer Graphics; 3(4), Oct.-Dec. 1997; pp. 352-369.

Claerbout, "Fundamentals of Geophysical Data Processing with Applications to Petroleum Prospecting," Blackwell Scientific Publications, 1985.

Clawson et al., "The Value of 3D Seismic Attributes for Illuminating Deep Water Deposits by Seismic Forward Modeling of the Brushy Canyon Formation," 2003 SEG Annual Meeting, Oct. 26-31, 2003, Dallas, Texas (only Abstract submitted).

Courrioux et al., "3D Volumetric modelling of Cadomian Terranes (Northern Brittany, France): an automatic method using Voronoi diagrams," Tectonophysics 331(1-2), Feb. 2001, pp. 181-196.

Cremeens et al., "On Chronostratigraphy, Pedostratigraphy, and Archaeological Context," Soil Science Society of America, 1995.

Cuisenaire, "Distance Transformations: Fas Algorthms and Applications to Medical Image Processing," Laboratoire de Telecommunications et Teledetection; Oct. 1999.

Davies, "Conditioning Poorly Sampled Gathers For Pre and Post Stack Analysis," Journal of Conference Abstracts, 2002, vol. 7, No. 2, pp. 142-143.

De Groot et al., "How to create and use 3D Wheeler transformed seismic volumes," SEG/New Orleans 2006 Annual Meeting, pp. 1038-1042.

Dorn, "Chapter 13, Interpreting 3-D Seismic Data," The Leading Edge, Sep. 1998, p. 1261-1272.

Dulac, "Advances in Chrono-Stratigraphic interpretation Modeling," First Break, vol. 27, pp. 69-72, Oct. 2009.

Durand-Riard et al., "Balanced restoration of geological volumes with relaxed meshing constraints," Computers and Geosciences, vol. 36, No. 4, pp. 441-452, Nov. 17, 2010.

EAGE Daily News, "Paradigm Is Re-defining Interpretation," May 2011.

Egan et al., "Three-Dimensional Modelling and Visualisation in Structural Geology: New Techniques for the Restoration and Balancing of Volumes," Proceedings of GIG Conference on Geological Visualisation—the Intelligent Picture?, British Geological Survey, Oct. 1996.

Escalona et al., Sequence-stratigraphic analysis of Eocene clastic foreland basin deposits in central Lake Maracaibo using high-resolution well correlation and 3-D seismic data, AAPG Bulletin, vol. 90, No. 4, pp. 581-623 (Apr. 2006) (only Abstract submitted).

Frank et al., "3D-reconstruction of Complex Geological Interfaces from Irregularly Distributed and Noisy Point Data," Computers & Geosciences 33 (2007) 932-943.

Frank, "Advanced Visualization and Modeling of Tetrahedral Meshes," Doctorat de l'Institut National Poly technique de Lorraine; pp. 1-140; 2006.

"Geomodeling Releases VisualVoxAT™ 6.2 Software—Introducing the Geobody Paintbrush," New Release, Sep. 24, 2007, printed from http://www.geomodeling.com/news_22.htm; on Oct. 5, 2009.

Gibbons, "Seismic Applications Overview," Society of Petroleum Engineers, Aug. 2003, 9 pages.

Harris et al., "Fault Seal Risk Volumes—A New Tool for the Assessment of Reservoir Compartmentalisation" 71st EAGE Conference & Exhibition—Amsterdam, The Netherlands, Jun. 8-11, 2009.

Jayr et al., "The Need for a Correct Geological Modelling Support: the Advent of the UVT-Transform," First Break, vol. 26, Oct. 2008, pp. 73-79.

Jentzsch et al., "Kinematic subsidence modelling of the Lower Rhine Basin," Netherlands Journal of Geosciences, vol. 81, No. 2, pp. 231-239 (2002).

Jones, "Data structures for three-dimensional spatial information systems in geology," Int. J. Geographical Information Systems, 3(1), 1989, pp. 15-30.

Labrunye et al., "New 3D flattened space for seismic interpretation," SEG Houston 2009 International Exposition and Annual Meeting, pp. 1132-1136.

Ledez, "Modelisation D'Objets Naturals par Formulation Implicite," Ecole Nationale Superieure de Geologie; Oct. 28, 2003; pp. 1-158, see English Abstract.

Lee et al., "Pitfalls in Seismic Data Flattening," The Leading Edge, Feb. 2001, pp. 161-164.

Lepage, "Generation de Maillages Tridimensionnels Pour la Simulation des Phenomenes Physiques en Geosciences," Ecole National Superieure de Geologie; Oct. 28, 2003; pp. 1-224, see English Abstract.

Lessenger et al., "An Inverse Stratigraphic Simulation Model: Is stratigraphic Inversion Possible?" Energy Exploration & Exploitation, vol. 14, No. 6, pp. 627-637 (1996) (only Abstract submitted).

Ligtenberg et al., "Sequence Stratigraphic Interpretation in the Wheeler Transformed (Flattened) Seismic Domain," EAGE 68th Conference & Exhibition—Vienna, Austria, Jun. 12-15, 2006.

Liwanag, "Reservoir Characterisation, Introducing geological processes in reservoir models," GEO ExPro Oct. 2005, pp. 28-32.

Lixin, "Topological relations embodied in a generalized tri-prism (GTP) model for a 3D geoscience modeling system," Computers & Geosciences 30(4), May 2004, pp. 405-418.

Lomask et al., "Flattening Without Picking," Geophysics, vol. 71, No. 4, pp. p. 13-p. 20, Jul.-Aug. 2006.

Lomask et al., "Flattening Without Picking," Stanford Exploration Project, Report 112, Nov. 11, 2002, pp. 141-150.

Lomask et al., "Update on Flattening Without Picking," Stanford Exploration Project, Report 120, May 3, 2005, pp. 137-159.

Lomask, "Flattening 3-D Seismic Cubes Without Picking," Jan. 8, 2004.

Mallet, "Discrete Smooth Interpolation in Geometric Modelling," Journal of Computer Aided Design, 24(4), 1992, pp. 178-191.

Mallet, "Numerical Earth Models," 2008 EAGE Publications, ISBN 978-90-73781-63-4, p. 147-157.

Mallet, "Space-time Mathematical Framework for Sedimentary Geology," Journal of Mathematical Geology, vol. 36, No. 1, Jan. 2004, pp. 1-32.

Mallet, Geomodeling (Book chapter); Chapter 6; Oxford University Press; cover and preface pages and pp. 244-315, 2002.

Mallet, *Geomodeling*, Oxford University Press, Sep. 22, 2004 (ISBN 0-19-514460.0).

Mitchum et al., "Seismic Stratigraphy and Global Changes of Sea Level, Part 6: Stratigraphic Interpretation of Seismic Reflection Patterns in Depositional Sequences," received Jan. 6, 1977, accepted Jun. 13, 1977, pp. 117-133.

Monsen et al., "Geological process controlled interpretation based on 3D Wheeler diagram generation," SEG/San Antonio 2007 Annual Meeting, pp. 885-889.

Moretti et al., "KINE3D: a New 3D Restoration Method Based on a Mixed Approach Linking Geometry and Geomechanics," Oil & Gas Science and Techonology, Rev. IFP, vol. 61 (2006), No. 2, pp. 277-289.

Moyen et al., "3D-Parameterization of the 3D Geological Space—The Geochron Model," 9th European Conference on the Mathematics of Oil Recovery, Geological Modelling I, Aug. 30, 2004.

Moyen, "Paramétrisation 3D de L'espace en Géologie Sédimentaire: Le Modéle Geochron Thése," Doctorat de l'Institut National Polytechnique de Lorraine, Jun. 9, 2005 (original text in French and English translation).

Müller et al. "3D Restoration and mechanical properties," from structure.harvard.edu/projects/restoration, Harvard University Structural Geology and Earth Resources Group, 2005, accessed on Aug. 21, 2012.

OpendTect Workflows Documentation version 4.2, dGB Beheer B.V., dGB Earth Sciences, Copyright © 2002-2010.

Oyedele, "3D High Resolution Seismic Imaging of Middle-Late Quaternary Depositional Systems, Southeast Green Canyon, Sigsbee Escarpment, Gulf of Mexico," Thesis presented to the Faculty of the Dept. of Geosciences at the University of Houston, Aug. 2005.

(56) References Cited

OTHER PUBLICATIONS

Rouby et al., "3-D Restoration of Complexly Folded and Faulted Surfaces Using Multiple Unfolding Mechanisms," AAPG Bulletin, vol. 84, No. 6, pp. 805-829 (Jun. 2000).
Rumpf et al., "A Continuous Skeletonization Method Based on Level Sets," Joint EUROPGRAPHICS—IEEE Symposium on Visualization, pp. 151-157 (2002).
Saito, "New Algorithms for Euclidean Distance Transformation of an n-Dimensional Digitized Picture with Applications," Pattern Recognition, 27(11) 1994; pp. 1551-1565.
Samson et al., "Quantifying the Impact of Structural Uncertainties on Gross-Rock Volume Estimates", SPE 1996, pp. 381-392.
Souche, "Integration of fault models into unstructured grids and geo-chronological space," 24$^{th}$ GOCAD Meeting, Jun. 2004.
Stark, "Generation of a 3D seismic 'Wheeler Diagram' from a high resolution Age Volume," pp. 782-786, submitted to the 75th Annual SEG Convention, Nov. 6-11, 2005, Houston, TX.
Stark, "Relative Geologic Time (Age) Volumes—Relating Every Seismic Sample to a Geologically Reasonable Horizon," The Leading Edge, Sep. 2004, pp. 928-932.
Terraspark Geosciences, "Geoscience Interpretation Visualization Consortium (GIVC)," http://terraspark.com/GIVC.consort, accessed on May 11, 2006.
Tertois et al., "Editing faults within tetrahedral volume models in real time," In Jolley, S.J., Barr, D., Walsh, J.J. et al. (Eds), Structurally Complex Reservoirs, London, UK: Geological Society of London, Special Publications 2007; v. 292; p. 89-101 (doi: 10.1144/SP292.5).
Tertois et al., Real-time Tetrahedral Volume Editing Accounting for Discontinuities; Ninth International Conference on Computer Aided Design and Computer Graphics (CAD/CG 2005) 2005 IEEE; pp. 1-6).
Tertois, "Création et édition de modéles géologiques par Champs de potential: Application au modele GeoChron—Thése," Institut National Polytechnique de Lorraine, Jun. 21, 2007.
Tertois, Preserving Geological Information During Real-Time Editing of Faults in Tetrahedral Models; Int. Assoc. for Mathematic Geology Xith International Congress Universite de Liege—Belgium; 2006; S14-24; pp. 1-4.
Thomsen et al., "Towards a balanced 3D Kinematic Model of a Faulted Domain—the Bergheim Open Pit Mine, Lower Rhine Basin," Netherlands Journal of Geoscience, vol. 81, No. 2, pp. 241-250 (2002).
Thore et al., Integration of Structural Uncertainties into Reservoir grids construction—70th EAGE Conference & Exhibition—Rome, Italy, Jun. 9-12, 2008.
Trudgill et al., "Integrating 3D Seismic Data with Structural Restorations to Elucidate the Evolution of a Stepped Counter-Regional Salt System, Eastern Louisiana Shelf, Northern Gulf of Mexico," pp. 165-176. (2004).
Wen et al., "Use of Border Regions for Improved Permeability Upscaling," Mathematical Geology, 35(5), Jul. 2003; pp. 521-547.
Wood et al., "Applying Sequence Stratigraphy and Seismic Stratal Slice Technology in the Gulf of Mexico," GASTIPS, Lang et al. (Eds.), Winter 2003, vol. 9, No. 1, pp. 10-21.
Zeng et al., High-frequency Sequence Stratigraphy from Seismic Sedimentology: Applied to Miocene, Vermilion Block 50, Tiget Shoal Area Offshoure Louisiana, AAPG Bulletin, Feb. 2004, vol. 88, No. 2, pp. 153-174 (only Abstract submitted).
Zeng et al., "Interpretive Advantages of 90 Degree-Phase Wavelets: Part 2—Seismic Applications," Geophysics, SEG, vol. 70, No. 3, May 2005-Jun. 2005. pp. C-17-C-24.
Zeng et al., "Seismic Frequency Control on Carbonate Seismic Stratigraphy: A Case Study of the Kingdom Abo Sequence, West Texas," AAPG Bulletin, vol. 87, Issue No. 2, pp. 273-293 (2003) (only Abstract submitted).
Zeng et al., "Stratal Slicing of Miocene-Pliocene Sediments in Vermilion Block 50-Tiger Shoal Area, Offshore Louisiana," The Leading Edge, Offshore Technology Special Section, vol. 20, No. 4, Apr. 2001, pp. 408-418.
Zeng et al., "Stratal Slicing, Part I: Realistic 3-D Seismic Model," Geophysics, Seg, vol. 63, No. 2, Mar. 1998-Apr. 1998, pp. 502-513.
Zeng et al., "Stratal Slicing, Part II: Read 3-D Seismic Data," Geophysics, vol. 63, No. 2 (Mar.-Apr. 1998); pp. 514-522.
Zeng et al., "Three-D Seismic Facies Imaging by Stratal Slicing of Miocene-Pliocene Sediments in Vermilion Block 50-Tiger Shoal Area, Offshore Louisiana," Secondary Gas Recovery, AAPG 2000.
Zeng, "From Seismic Stratigraphy to Seismic Sedimentology: A Sensible Transition," GCAGS Transactions, vol. 51, pp. 413-420 (2001) (only Abstract submitted).
Zeng,"Stratal Slicing: Benefits and Challenges," The Leading Edge 29, 1040 (Sep. 2010).
Zeng et al., "Stratal Slicing and Seismic Facies Imaging," Bureau of Economic Geology, The University of Texas at Austin, 1998. (only Abstract submitted).
International Search Report issued for PCT International Application No. PCT/IB2004/002030, dated Jan. 25, 2005.
Notice of Allowance issued for U.S. Appl. No. 11/628,559, dated Dec. 24, 2009.
Office Action issued for U.S. Appl. No. 11/628,559, dated Jun. 24, 2009.
Notice of Allowance issued for U.S. Appl. No. 12/791,370, dated Jul. 22, 2013.
Office Action issued for U.S. Appl. No. 12/791,370, dated Nov. 26, 2012.
Paradigm SKUA 2009 User Guide: Part V Seismic Interpretation Modeling. Published Feb. 3, 2009.
GoCAD Suite 2.5 User Guide: Parts 1-12. Published Sep. 15, 2007.
Notice of Allowance issued for U.S. Appl. No. 12/791,352, dated Dec. 6, 2013.

* cited by examiner

SYSTEMS AND METHODS FOR GENERATING A GEOLOGICAL MODEL HONORING HORIZONS AND FAULTS

PRIOR APPLICATION DATA

This application claims the benefit of prior U.S. Provisional Application Ser. No. 61/605,866, filed Mar. 2, 2012, which is incorporated by reference herein in its entirety.

FIELD OF THE INVENTION

The invention pertains to the general field of modeling stratified terrains in the subsurface.

BACKGROUND OF THE INVENTION

Erosion and tectonic activity through geological-time may transform an initially uniform stratified terrain composed of a continuous stack of level surfaces to a terrain fractured by faults forming discontinuities across the originally continuous horizons. To gain insight into the current models, some systems may generate predicted models of the original or "depositional" structures at a time period when the structures were originally formed. In order to model the original time of deposition, the model may simulate a reversal of time and the associated erosion and tectonic activity. Scientists may prefer to work with the depositional model due to its simple flat and continuous depositional layers, and then transform to the current model to apply any adjustments.

However, to accurately transform between the current and depositional models, there is a need in the art to correlate structures, such as, horizons and faults.

SUMMARY OF THE INVENTION

Embodiments of the invention may receive geological data representing a current configuration of faults and horizons, e.g., at a current geological time (such as, within the past several to tens of thousands of years). The geological data may be transformed or converted to a depositional model representing an estimated state of the subsurface structures at a time period when the subsurface structure was originally formed (such as, millions or billions of years ago). The geological data may be represented by a mesh of cells. The mesh of cells may be divided or cut by iso-surfaces to generate a plurality of sub-meshes. For example, cells may be tetrahedrons (in the 3D case) and triangles (in the 2D case), while sub-meshes may be hexahedrons (in the 3D case) and quadrilaterals (in the 2D case), although other shapes may be used. One set of the iso-surfaces (e.g., the horizontal surfaces) may represent horizons to create (e.g., top and bottom) faces of the sub-meshes that approximate planar surfaces along which the horizons were originally formed (e.g., horizontal surfaces). Other set(s) of iso-surfaces may be normal to the horizon iso-surfaces and each other. The plurality of sub-meshes may be further divided or cut into one or more sub-mesh parts by the faults transformed or converted into the depositional model. Sub-meshes not intersected by faults may be represented by undivided polyhedrons (having faces following iso-surfaces), while sub-meshes divided by faults may represented by a plurality of polyhedrons (having at least a facet approximating the surface of the fault). In one embodiment, iso-surfaces from each different set may have an equal angle therebetween, generating regular polyhedron sub-mesh parts when sub-meshes are undivided (e.g., hexahedrons in 3D and quadrilaterals in 2D) and regular or irregular polyhedron sub-mesh parts when sub-meshes are divided by faults. Sub-mesh parts divided from the same sub-mesh may be correlated and ordered so their relative orientation and physical relationship is preserved upon inverse transforming the sub-mesh parts back to a current time model. In one example, each sub-mesh part divided from the same sub-mesh may be indexed with a different sub-mesh part index (e.g., a different fourth dimensional index (p)), but the same sub-mesh index (e.g., the same three dimensional sub-mesh index (i,j,k) in Cartesian (x,y,z) coordinates). The polyhedron sub-mesh parts may be inverse transformed from the depositional model to generate a current model to represent the current configuration of the faults and horizons using inverse transformed polyhedron sub-mesh parts. In one example, when the inverse transformed polyhedrons are combined, they may form a current model that as a whole is a conform hexahedral-dominant polyhedron mesh. The depositional and/or current model may be displayed. In some embodiments, the level of detail of each model may be represented, set or altered between, e.g., a cell representation (e.g., including the basic cell components of the mesh) and a polyhedron representation (including a simplified representation of sub-mesh parts).

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

Figure 1:
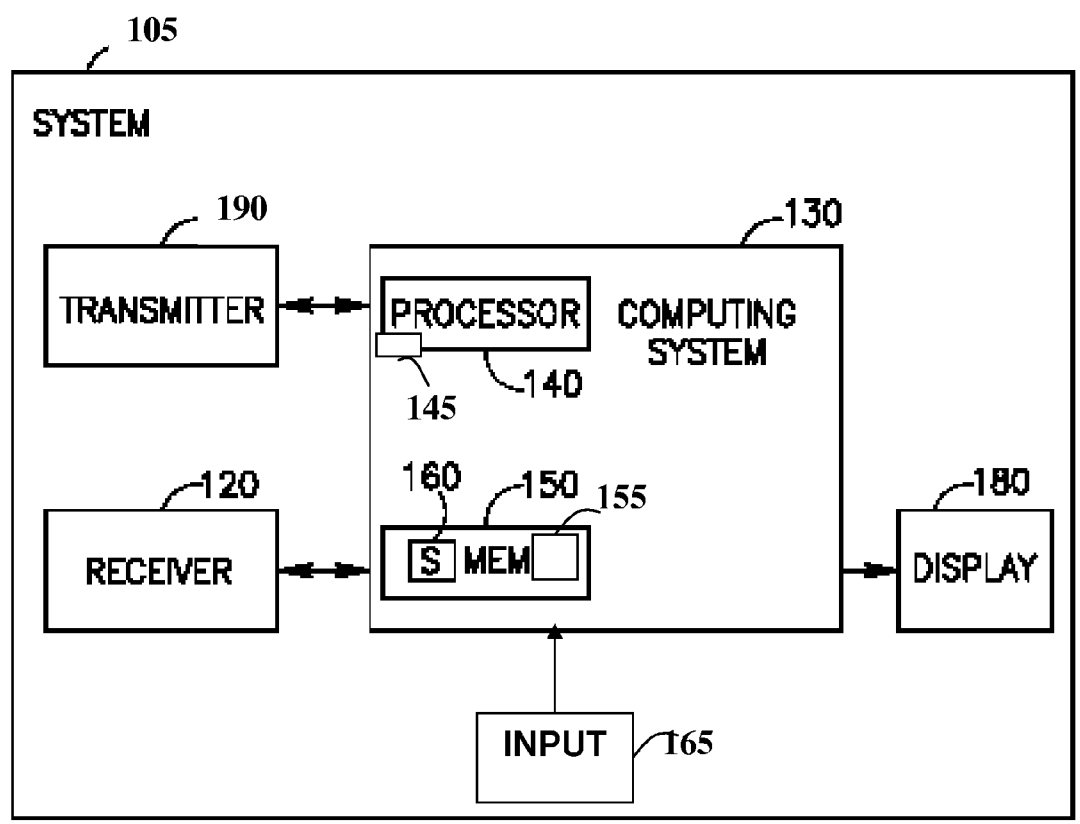
FIG. 1 is a schematic illustration of a system in accordance with an embodiment of the invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may create an accurate geological model that represents faults and horizons in their current or present configuration. The current or present model may include a plurality of cells arranged in a mesh, sub-mesh, lattice or grid array. A tetrahedron mesh may be used, in one example, which may have the benefit of flexibility, known topology, and relatively easily linear interpolation of each tetrahedron, but may form an unstructured mesh (e.g., caused by following complex fault surfaces).

Each cell of the mesh may include a plurality of faces (e.g., four faces in each tetrahedron). To represent the geometry of faults and horizons, current systems may cut or divide cells along faults and horizons, e.g., to create faces that follow or approximate the orientation of the faults and horizons. However, dividing the current model (e.g., the model representing underground features at the current time) at fault and horizon interfaces may create problems. In some cases, severe subsurface erosion and tectonic activity may create faults and horizons that are separated by only a small angle. Cutting or dividing cells along horizons and faults may create many "sliver" cells, which are very small cells that populate the small regions between small angle fault and horizon lines, thereby significantly increasing the number of cells and complexity of the model.

Instead of cutting or dividing the current or present model along fault and horizon lines, embodiments of the invention may transform or convert the current model into a past depositional model and cut the past depositional model along transformed fault and horizon lines. The depositional model may represent an estimated state of the subsurface structure at a time period when the subsurface structure was originally formed. The depth coordinate of the second model may measure the time period, t, of deposition. Since a horizon is generally deposited in approximately the same geological time (e.g., within a one to ten thousand year period), the horizon has a single depth coordinate and therefore may be represented as a planar surface in the second model. Accordingly, the transformation or conversion from the current model to the depositional model may flatten horizons from complex current structures into flat or planar surfaces.

Once transformed, the past depositional model may be cut or divided to generate a plurality of sub-meshes. In one embodiment, the sub-meshes may be cut or divided along or by iso-surfaces of the past depositional model, where iso-surfaces include planar surfaces (in 3D model) or lines (in 2D models) having a single value for one or more coordinates. In 3D models, sub-meshes may typically be represented by hexahedrons and in 2D models, sub-meshes may typically be represented by quadrilaterals. Each sub-mesh may be for example represented by a polyhedron having pairs of opposing faces, each pair divided by a different set of iso-surfaces. In the past model (e.g., the model representing deposition at a previous time), each horizon may be represented by an iso-surface in the time dimension (e.g., referred to as an iso t-surface) since each horizon may be deposited at approximately a single geological time. Accordingly, cutting the past model by or using iso t-surfaces may create faces of the sub-meshes that approximate the planar (e.g., horizontal) surfaces along which the horizons were originally formed. Other iso-surfaces (e.g., iso u and iso v-surfaces) may be normal to the horizon iso t-surfaces and to each other. The number of sets of normal iso-surfaces may be equal to the dimensionality of the model. For example, 3D models may include three sets of iso-surfaces (u,v,t) to create three pairs of faces for each six sided (hexahedral) sub-mesh and 2D models may include two sets of iso-surfaces (u,t) to create two pairs of edges for each four sided (quadrilateral) sub-mesh. Sub-meshes may be "regular" polyhedron having equal angles between pairs of opposing faces.

The plurality of sub-meshes may be further divided or cut into one or more sub-mesh parts or portions by the faults transformed into the second model. Although faults are not yet present at the depositional time, faults from the current model may be transformed to points in the depositional model estimated to evolve into the faults.

To avoid the problem of creating many small cells (e.g., sliver cells) and reduce the complexity of current models, embodiments of the invention represent all cells in each sub-mesh part by a single polyhedron (e.g., uniquely mapping one polyhedron to one sub-mesh part). Accordingly, the past model (and the current model once transformed) may be divided along faults, horizons (iso-t surfaces) and/or other iso-surfaces (iso-u surfaces and iso-v surfaces). The past and current models may be further-divided as desired. To create a single polyhedron that represents each sub-mesh part, embodiments of the invention may identify the major vertices of each sub-mesh part. The major vertices may be intersection points defining intersections of only iso-surfaces (when a sub-mesh is not cut by a fault), one or more iso-surfaces and one or more faults (when a sub-mesh is cut by one or two faults) or only faults (when a sub-mesh is cut by at least three faults). These vertices may define faces that represent horizons (and other iso-surfaces), as well as faults, which may be assembled to generate a polyhedron sub-mesh part.

Sub-mesh parts (e.g., polyhedrons) created by dividing the same sub-mesh may be correlated and ordered so their relative orientation and physical relationship is preserved upon inverse transforming the sub-mesh parts back into the current model. In one example, each sub-mesh part divided from the same sub-mesh may be indexed with a different sub-mesh part index (e.g., a different fourth dimensional index (p)), but the same sub-mesh index (e.g., the same three dimensional sub-mesh index (i,j,k) in Cartesian (x,y,z) coordinates).

Once the depositional model is cut into sub-mesh parts (e.g., polyhedrons) with faces that approximate the orientations of horizons and faults in the past model, the call parts may be inverse transformed, e.g., in their orientation-preserving order, to project those horizons and faults cuts back into the current model. Since faults in the past model are originally projected from the current model, applying the inverse transformation or conversion may return the same original faults to accurately honor the current fault configuration. For horizons, the faces cut by the planar depositional horizons in the past model are transformed to faces of corresponding sub-meshes of the current model, which thereby also inherently follow or approximate the orientation of horizons. Accordingly, by cutting sub-meshes along fault and horizon surfaces in the depositional model, sub-mesh part facets ordered according to their relative positions may automatically represent horizons and faults when transformed to the current model.

The geometry of each of sub-meshes, sub-mesh parts or portions, and meshes may differ, e.g., within a single model or from model to model. For example, in one model, cells may be tetrahedral, sub-meshes may be hexahedral and sub-mesh parts and the model as a whole may be any polyhedron. When a fault cuts a sub-mesh, the sub-mesh, composed of many cells, may be divided into two or more sub-mesh parts. When no fault cuts the sub-mesh, the sub-mesh may be represented by one sub-mesh part (e.g., the sub-mesh itself).

Reference is made to FIG. 1, which schematically illustrates a system 105 in accordance with an embodiment of the present invention.

System 105 may include a transmitter 190, a receiver 120, a computing system 130 and a display 180.

Transmitter 190 may transmit output signals, for example, acoustic waves, compression waves or other energy rays or waves, that may travel through subsurface (e.g., below land or sea level) structures. The transmitted signals may become incident signals that are incident to subsurface structures. The incident signals may reflect at various transition zones or geological discontinuities throughout the subsurface structures. The output frequency, wavelength and intensity of the seismic signals by transmitter 190 may be controlled by a computing system, e.g., computing system 130 or another computing system separate from or internal to transmitter 190.

Receiver 120 may accept reflected signal(s) that correspond or relate to incident signals, sent by transmitter 190.

Computing system 130 may include, for example, any suitable processing system, computing system, computing device, processing device, computer, processor, or the like, and may be implemented using any suitable combination of hardware and/or software. Computing system 130 may include for example one or more processor(s) 140, memory 150 and software 160. Data 155 generated by reflected signals, received by receiver 120, may be transferred, for example, to computing system 130. The data may be stored in the receiver 120 as for example digital information and transferred to computing system 130 by uploading, copying or transmitting the digital information. Processor 140 may communicate with computing system 130 via wired or wireless command and execution signals.

Memory 150 may include cache memory, long term memory such as a hard drive or disk, and/or external memory external to processor 140, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Memory 150 may store instructions (e.g., software 160) which when executed perform embodiments of the invention, and data 155. Data 155 may include, for example, raw seismic data collected by receiver 120, instructions for partitioning a 3D mesh, grid or other arrangement into polyhedron, instructions for building a model, instructions for converting or transforming (and inverse transforming) a model between a current geological model and a past depositional model, a current geological model (including, for example, a set of sub-mesh parts each including current geological data), an estimated or past geological model (including, for example, a set of sub-mesh parts or portions each including depositional geological data), an index defining a sub-mesh (e.g., by a coordinate in each dimension of the model, such as, (i,j,k) in three dimensions) and one or more sub-mesh parts within each sub-mesh (e.g., by an additional coordinate (p)), or other instructions or data. When discussed herein, manipulating geological data, such as the operations for calculating, forming, cutting, dividing, etc., cells or sub-meshes, may involve the manipulation of data stored in a memory which represents the corresponding geological structures, the cells, sub-meshes, sub-mesh parts, horizons or faults.

Processor 140 may include a local or internal memory 145, such as a cache memory, for relatively fast access to data, e.g., as compared to memory 150.

Input device(s) 165 may include a keyboard, pointing device (e.g., mouse, trackball, pen, touch screen), or cursor direction keys, for communicating information and command selections to processor 140. Input device 165 may communicate user direction information and command selections to processor 140. For example, a user may use input device 165 to select or toggle between displaying a current model (e.g., current model 1100 of FIG. 11) and a past depositional model (e.g., depositional model 1000 of FIG. 10) of the same subsurface structure, select a model mode (e.g., a simplified polyhedron representation 1201 or a more detailed cell representation 1202 of FIG. 12), edit, perform geometrical computations, highlight models, etc. Computations, editing and displaying may be relatively faster (though potentially less accurate) in polyhedron representation 1201 as compared with cell representation 1202. A display 180 monitor may output a visualization or model image of the user-commanded operations executed by processor 140.

Display 180 may display data from transmitter 190, receiver 120 or computing system 130. For example, display 180 may display visualizations of subsurface models including a current model (e.g., current model 104 of FIG. 2) or an original depositional model (e.g., depositional model 106 of FIG. 2).

Figure 2:
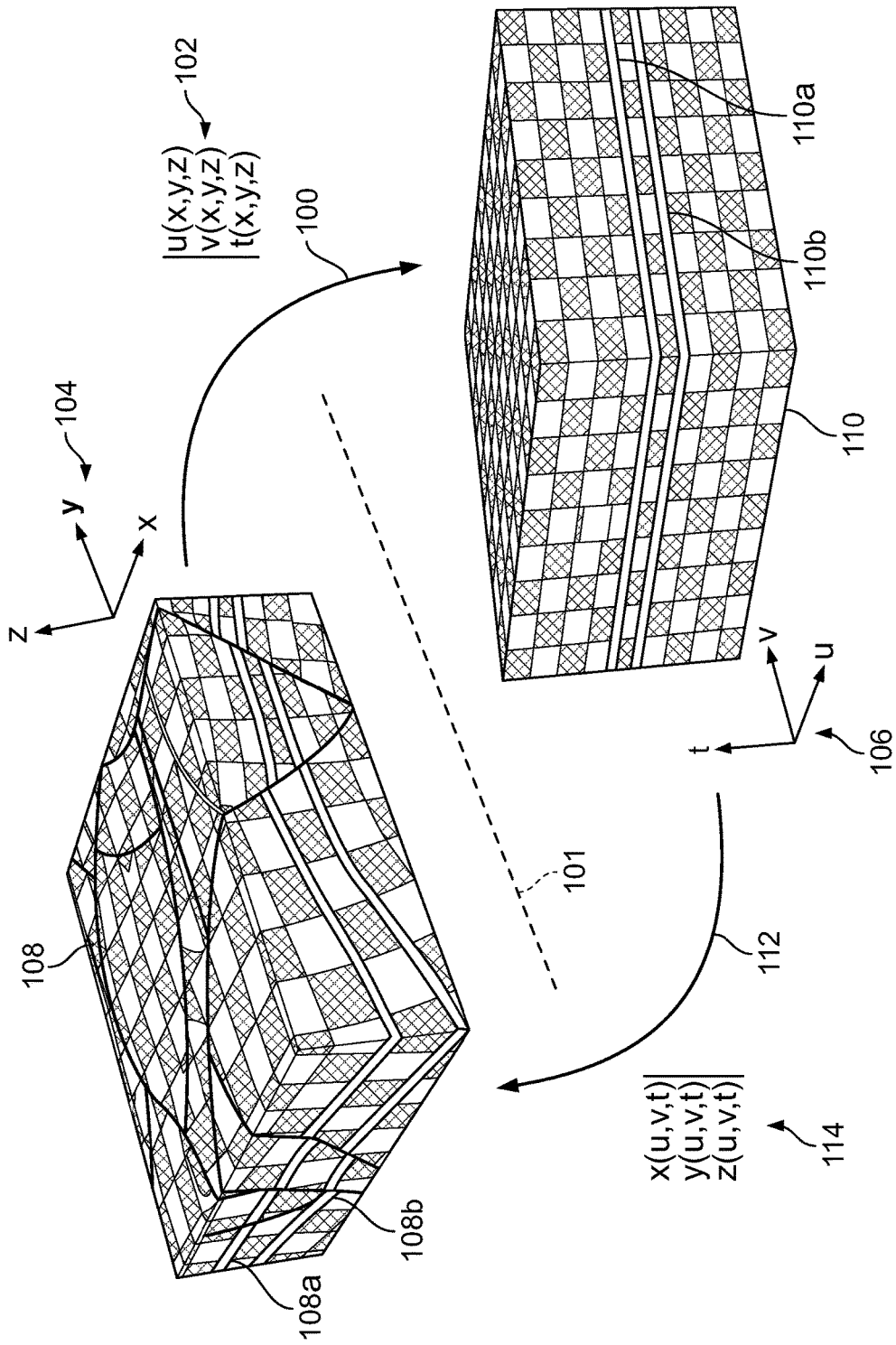
FIG. 2 is a schematic illustration of a transformation between a current model and an original depositional model in accordance with an embodiment of the invention.

Reference is made to FIG. 2, which schematically illustrates a transformation or conversion between a current model 104 and an original depositional model 106 (separated by dashed line 101).

Current model 104 may represent the current modeled locations of particles of sediment in the terrain (typically at a granularity larger than that representing each particle). Current model 104 may be a 3D model in a Cartesian (x,y,z)-space, where the location of each particle is represented by the coordinates (x,y,z), where (x,y) may describe the geographical coordinates of the particle (e.g., latitude and longitude) and (z) may describe the altitude or distance below or above a surface level.

Depositional model 106 may represent estimated or predicted (past) locations of particles of sediment at the time when the particles were originally deposited. Depositional model 106 may be a 3D model in an (u,v,t)-space, where each particle may be represented by the coordinates (u,v,t) where (t) may be the geological-time of deposition of the particle and (u,v) may be the paleo-geographical coordinates of the particle at geological-time (t).

The "forward" or "direct" transformation 100 may be defined by functions 102 {u(x,y,z),v(x,y,z),t(x,y,z)}, which convert or transform each point (x,y,z) of current model 104 to a point {u(x,y,z),v(x,y,z),t(x,y,z)} of depositional model 106. The forward transformation 100 may be represented, for example, as follows:

$$(x, y, z) \xrightarrow{UVT} \{u(x, y, z), v(x, y, z), t(x, y, z)\} \quad [1]$$

The forward transformation or conversion 100 transforms each horizon H(t) (e.g., 108a or 108b) of current structure 108, in current model 104, into a level horizontal plane H*(t) (e.g., 110a and 110b, respectively) of depositional structure 110 in depositional model 106. In depositional model 106, horizons 110a and 110b of structure 110 are simply the images of the level surfaces of the function t(x,y,z) representing the geological-time at location (x,y,z). That is, since a horizon models a set of particles of sediment that was uniformly deposited in time, each horizon is constant at the time when the particles modeled thereby were originally deposited (e.g., in depositional model 106). Therefore, each horizon 110a and 110b in depositional model 106 may be planar and uniquely defined by a single time, (t).

Conversely, the "inverse" or "reverse" conversion or transform 112 may be defined by functions 114 {x(u,v,t), y(u,v,t), z(u,v,t)}, which transform each point (u,v,t) of the depositional model 106 to a point {x(u,v,t), y(u,v,t), z(u,v,t)} in current model 104. The inverse transformation 112 may be represented, for example, as follows:

$$(u, v, t) \xrightarrow{UVT^{-1}} \{x(u, v, t), y(u, v, t), z(u, v, t)\} \quad [2]$$

Using the forward transform or conversion 100, e.g., defined in equation (1), and the inverse transform 112, e.g., defined in equation (2), any geological property may be modeled in one of the two models (current model 104 or depositional model 106) and the result of the property modeled in the one space may be transferred to the other space (depositional model 106 or current model 104, respectively). In practice, a geological property is typically modeled in the space where modeling the property is the simplest. For example, horizons may be modeled in depositional model 106 where they have a simple flat planar form. Faults may be modeled first in current model 104 since they did not exist in the original depositional time, and may then be transformed to depositional space, to model their interaction with the planar horizons in depositional model 106.

Embodiments of the invention may generate a regular polyhedron or hexahedron dominant grid (a grid or mesh having mostly or primarily regular polyhedron sub-meshes, hexahedral sub-meshes in the 3D case). Embodiments of the invention may create a 3D semi-structured grid that conforms to stratigraphy and faults. A semi-structured grid may mean that each sub-mesh in the grid has a unique index (i,j,k), but the 0, 1 or >1 sub-mesh parts within each sub-mesh may be unstructured (e.g., having any unstructured shape following fault surfaces). The sub-mesh parts may be polyhedral (e.g., hexahedral, tetrahedral, prism, pyramidal, or general polyhedral). Sub-meshes that are not intersected by faults or discontinuities may have only one hexahedral sub-mesh part. Sub-meshes that are intersected by faults may have multiple polyhedron sub-mesh parts, or, if a fault only partially intersects the sub-mesh (e.g., referred to as a "dying faults"), may have one concave (partially cut or fractured) sub-mesh.

The grid or mesh may be a feature-aligned conform structured hexahedron-dominant grid. A conform mesh may be a mesh where the cells align and only intersect at vertices (e.g. there are no "dangling" vertices in which a vertex of one cell intersects an edge or face of another cell); when used herein, a "conform" structure such as a mesh or grid that has cells that align, coincide or fit together (e.g., adjacent cells share all vertices, edges and faces, except for cells at the mesh boundary that have no adjacent counterpart). A feature-aligned grid may mean that each geology feature (faults, horizons and unconformity surfaces) in the model is represented by a subset of sub-mesh faces whose nodes are restricted to the feature surface in the model. A structured grid may mean that sub-meshes are arranged in a Cartesian manner and that each sub-mesh has a unique index (i,j,k). A sub-mesh may have 0, 1 or >1 sub-mesh parts or portions. Each sub-mesh part may have a unique index (i,j,k,p) indicating the pth sub-mesh part in the sub-mesh (i,j,k). A sub-mesh that has 0 sub-mesh parts may mean that the sub-mesh is inactive. A sub-mesh that has 1 part may mean that a fault does not cross the sub-mesh. A sub-mesh that has >1 parts may mean that the sub-mesh that are intersected by some discontinuities (e.g., faults and unconformities). In this case, the sub-mesh parts may be polyhedral (tetrahedral, prism, pyramidal, hexahedral, or general polyhedral). A hexahedron-dominant grid may mean that most of the sub-meshes in the model (e.g., >50%) are not intersected by discontinuities and therefore are complete sub-meshes with only one hexahedral part. Since polyhedron sub-mesh parts are allowed along discontinuities, the fault network used in the model may be highly complex. By allowing sub-meshes to be concave, dying faults may be nicely represented. Since the grid is feature-aligned and structured, quality upscaling (e.g., increasing resolution or decreasing polyhedron/sub-mesh size) may be executed on this grid.

The subsurface volume may be discretized into a grid or other arrangement of individual 3D cells. In one embodiment, this discretization may not be random, but may follow the geology of the horizons and faults.

According to embodiments of the present invention, to represent a complex network of faults in a volume of interest in a Cartesian (x,y,z) geometric space, a cell mesh may be used in which the faults are represented as a contiguous subset of cell faces of the mesh. A mesh that honors faults and horizons (e.g., aligns or orients cell faces to approximate faults and horizons) may be generated by decomposing the cell mesh representing the faults by the horizons. However, such method may have drawbacks, such as:

slivers may form during the decomposition process of the cell mesh.
fully-unstructured results may be generated.
cell boundaries may not follow the internal stratigraphy in between horizons.

Embodiments of the invention may provide a method for generating a mesh that honors faults and horizons and may overcome or reduce the impact of the aforementioned limitations or have other or different benefits. Embodiments of the invention may use a transformation (e.g., transformation 100 of FIG. 2), such as, a (u,v,t) parameterization of the (x,y,z) coordinate system, that maps horizons to planar surfaces (e.g., iso-surfaces of the t parameterization). In the 3D (e.g., u,v,t) geological space, three sets of iso-surfaces may be defined in the three dimensions, each with monotonically increasing iso-values. One set of iso-surfaces (iso t-surfaces) may represent the horizons at each depositional time period (e.g., within a period of a few thousand or tens of thousands of years). The other two sets of iso-surfaces are normal to the first set and normal to each other. These three sets of iso-surfaces may form a structured Cartesian grid in which each sub-mesh may be uniquely indexed using a triplet (i, j, k). A subset of sub-meshes may be intersected by one or more faults.

The mesh may be divided or cut along these three sets of iso-surfaces to generate sub-meshes. As a result, each sub-mesh may contain a network of cells with boundaries along the six bounding iso-surfaces. If a sub-mesh is intersected by a fault, the sub-mesh may also include boundaries that represent parts of the fault. In some configurations, a sub-mesh may include a number of (n) connected components that may be referred to as sub-mesh parts. The 3D parts of a sub-mesh (i, j, k) may be uniquely indexed using a quadruplet (i, j, k, p).

Thus, a structured grid bounded by horizons (and other iso-surfaces) may be formed with local refinements (e.g., cuts) along fault lines. Each of the individual sub-mesh parts may have cell faces along horizons (iso t-surfaces), internal-stratigraphy and faults, plus the additional U and V iso-surfaces. To solve the remaining "sliver" problem, embodiments of the invention may generate a simplified representation of the grid. For example, a single polyhedron may be generated to represent each sub-mesh part, e.g., such that the resulting simplified grid has a conform geometry.

To compute the polyhedron of a sub-mesh part, a process or processor (e.g., executed by a computing system, such as, computing system 130 of FIG. 1) may proceed, for example, as follows (other operations or specific details may be used):

(a) For each of the N boundaries on iso-surfaces or faults of a sub-mesh part:
1. Identify points that are simultaneously on:
3 iso-surfaces, or
2 iso-surfaces+1 fault, or
1 iso-surfaces+2 fault, or
3 faults
2. Sort the points in counter-clockwise order; and
3. Construct a polygon from these points.
(b) Construct a polyhedron from the N polygons.

A sub-mesh that is not intersected by any fault may have only one part. Such a sub-mesh part may have six faces that may, e.g., correspond to a pair of faces at two spaced values for each of the three iso-surfaces. Therefore, the resulting shape may be a hexahedron. Other numbers of surfaces may be used. On faulted sub-meshes, the sub-mesh parts may be composed of tetrahedrons, prisms, pyramids or any other polyhedron. Since in typical datasets, most of the sub-meshes are not faulted, the resulting grid may be a hexahedron-dominant polyhedron mesh.

With this simplified polyhedron representation of the model, the polyhedrons (defining the essence or main features of the model) may be viewed (e.g., displayed or visualized) or represented (e.g., as data stored in memory, processed, computed or manipulated) separately from the cells (defining the topological/geometrical details in a more detailed representation). The polyhedron information for the polyhedron representation and the cell information for the cell representation may be decoupled (e.g., computed, processed or rendered independently or separately). This decoupling may in one embodiment not only solve the problems of fully-unstructured results and cell boundaries that do not follow the internal stratigraphy in between horizons, but also offer the possibility to reduce the memory used for the grid by storing only the simplified polyhedron mesh in the memory and loading the more complex cell model e.g. from disk when they are needed for computations on the detail geometry, for example, the exact volume of a sub-mesh.

Embodiments of the invention may generate a current model having one or more of the following advantages or features (although other or additional advantages may be achieved, and not all embodiments may include the following features):

Features aligned: faces aligned to geological features (faults, horizons and unconformities).
Conform geometry.
Structured: A single 3D Cartesian grid in parametric space (UVT). Each (i,j,k) sub-mesh may have p parts, e.g., each part is indexed as (i,j,k,p).
Hexahedron-dominant: Most of the sub-meshes are complete or undivided by faults, e.g., and are represented by a single (hexahedral) part.
Handles fault networks with arbitrary complexities.
Handles dying faults: a polyhedron may be concave or split.
Quality upscaling.
Few slave cells (tiny volume). In some embodiments, a minimum size (volume) of cells may be set, for example, defining the model resolution. Cell size may be defined by minimum edge length, which may be the same or may vary between sub-meshes and horizon layers.

Figure 3:
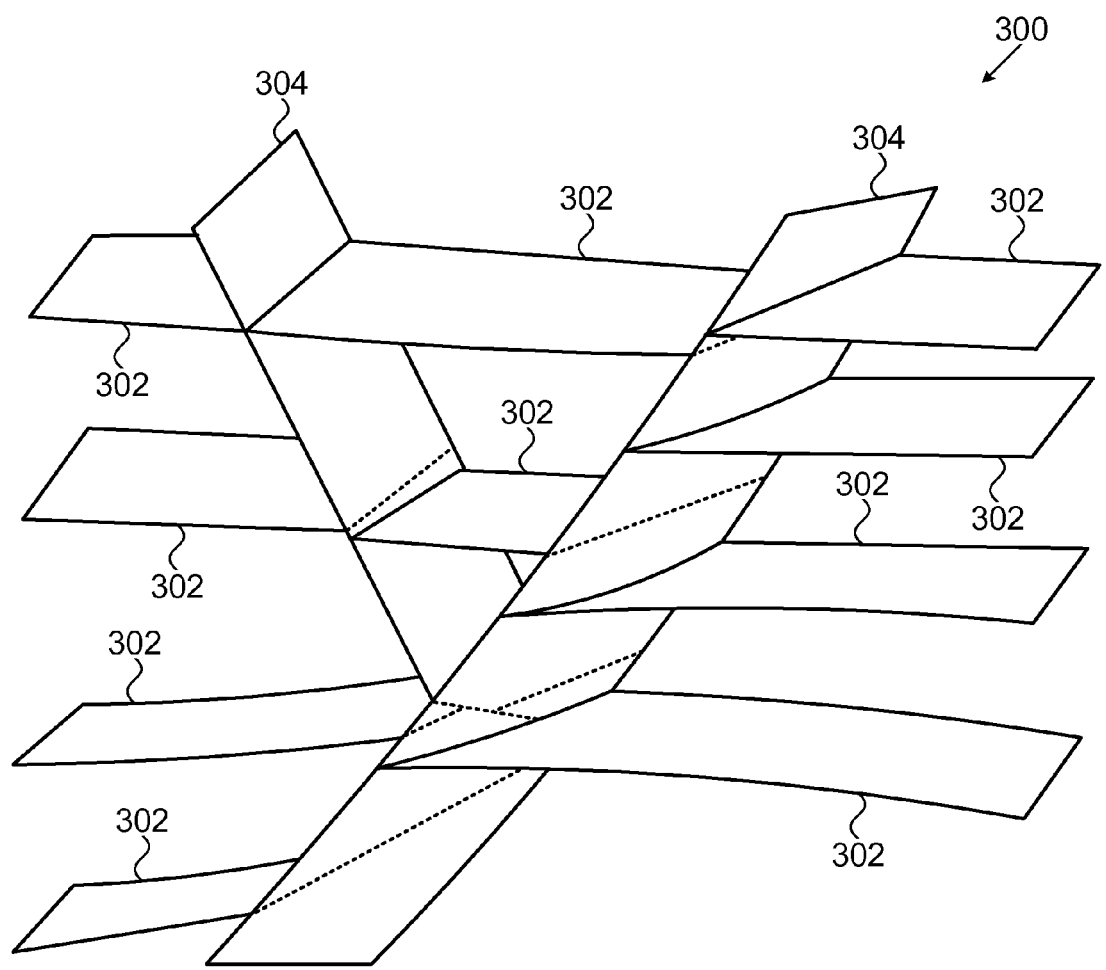
FIG. 3 is a schematic illustration of a horizon and fault network configured in a current geological time in accordance with an embodiment of the invention.
Figure 3:
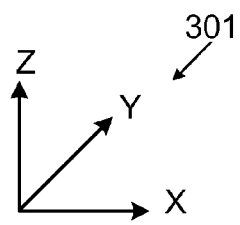

Reference is made to FIG. 3, which schematically illustrates a network 300 of horizons 302 and faults 304 in a current geological time configuration in accordance with an embodiment of the invention. Horizons 302 and faults 304 may represent geological variations and discontinuities as they currently appear in a current geological space 301 (e.g., (x,y,z)-space 114 of FIG. 2). Horizons 302 (e.g., horizons 108 of FIG. 2) and faults 304 may be generated, e.g., by computing system 130 of FIG. 1, or received via input 165 of FIG. 1 from an external source.

Figure 4:
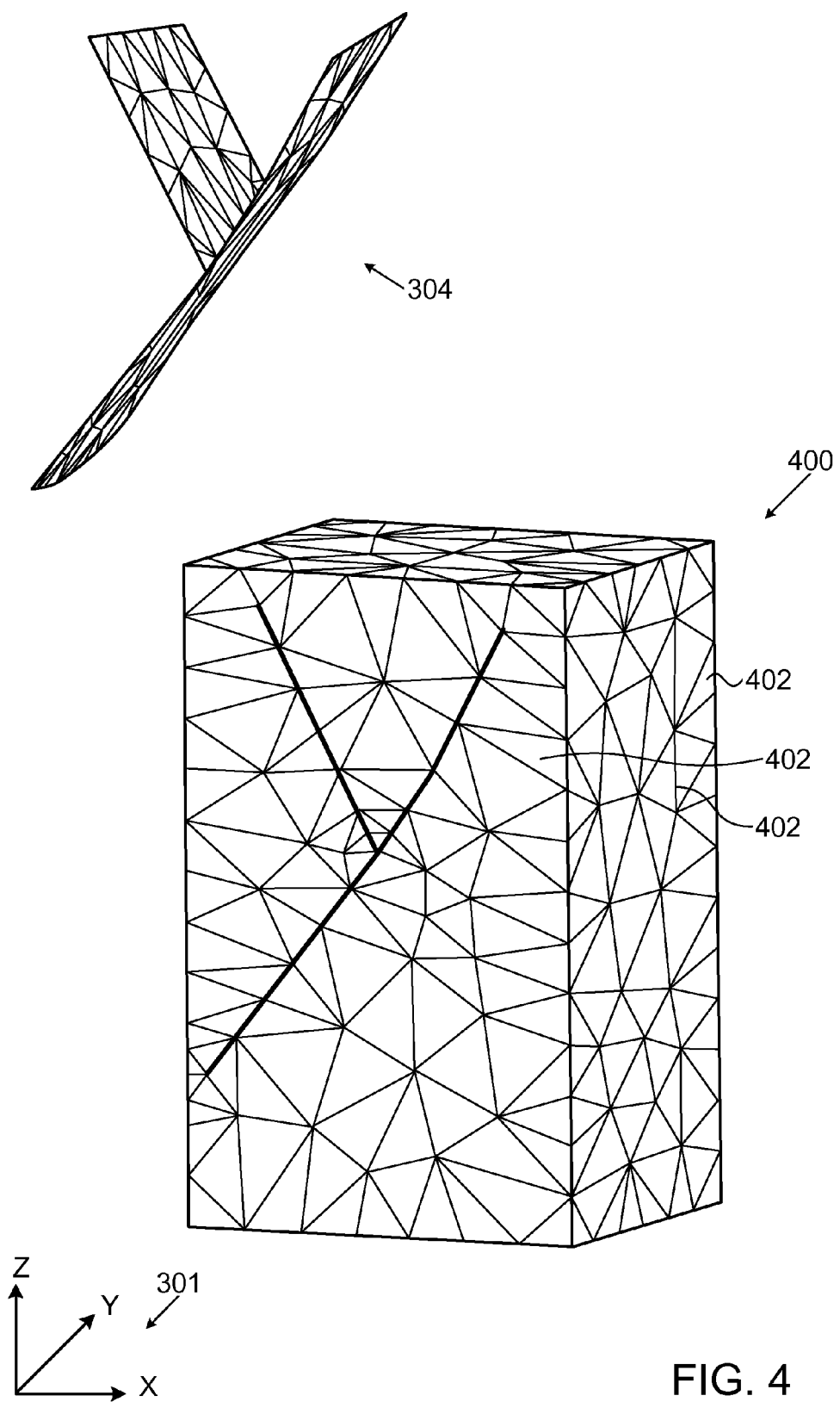
FIG. 4 is a schematic illustration of the fault network of FIG. 3 and a mesh used to generate a current model in accordance with an embodiment of the invention.

Reference is made to FIG. 4, which schematically illustrates the fault network of FIG. 3 and a mesh 400 used to generate a current model in accordance with an embodiment of the invention. Mesh 400 may include a plurality of cells 402. Mesh 400 may be an unstructured grid, e.g., cells may be uniquely defined by their connectivity with each other, but not simply by Cartesian coordinates (i,j,k). An unstructured mesh 400 may be used for its flexibility and accuracy in approximating complex geological lines and surfaces. In the example of FIG. 4, cells 402 are tetrahedral, although any other polyhedron cells may also be used.

Figure 5:
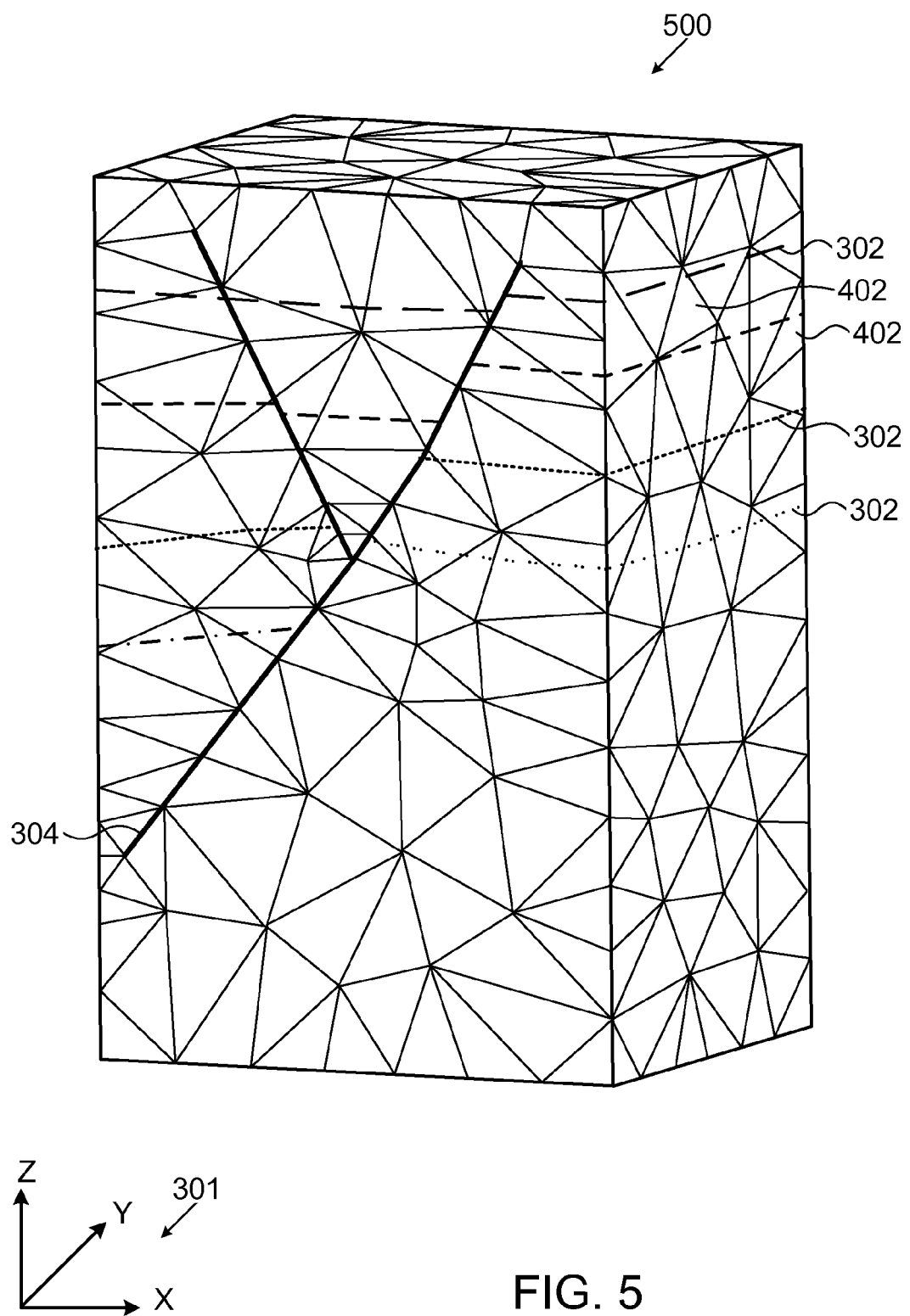
FIG. 5 is a schematic illustration of a current model of the horizon and fault network of FIG. 3 in accordance with an embodiment of the invention.

Reference is made to FIG. 5, which schematically illustrates a current model 500 of horizons 302 and faults 304 of FIG. 3 in accordance with an embodiment of the invention. Current model 500 (e.g., current model 104 of FIG. 2) may represent geological structures as they currently appear in a current geological space 301 (e.g., (x,y,z)-space 114 of FIG. 2). Current model 500 may model fault 304 network by mesh 400 of FIG. 4, for example, dividing cells 402 to approximate fault 304 surfaces. According to embodiments of the invention, horizons 302 may not divide cells 402 in the current model 500, e.g., since such division may generate complex sliver cell arrays or sub-meshes, but may instead transform to a past depositional model for such division, e.g., as described in reference to FIG. 6.

Figure 6:
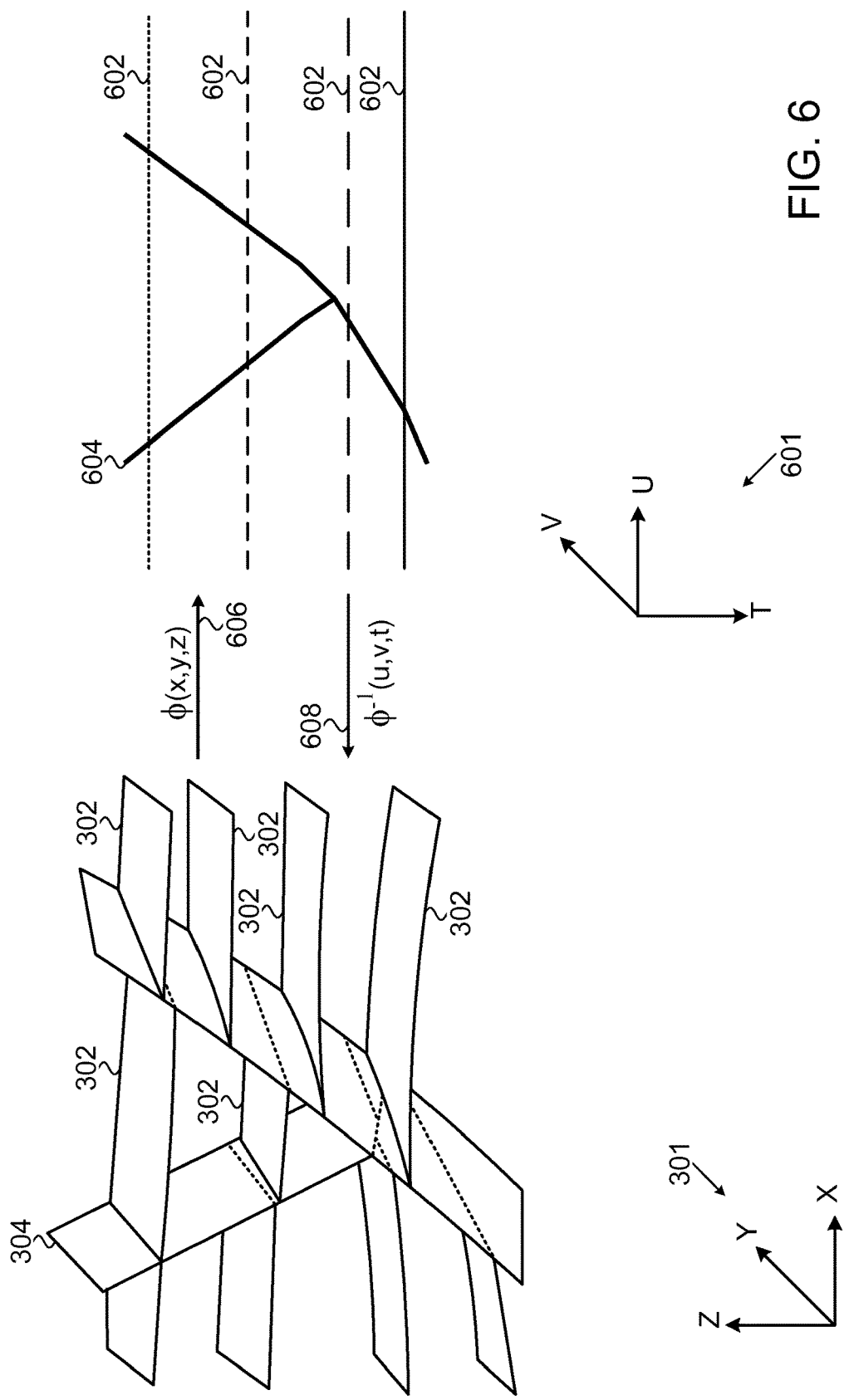
FIG. 6 is a schematic illustration of the horizon and fault network of FIG. 3 transformed to a horizon and fault network in a past depositional geological time configuration in accordance with an embodiment of the invention.

Reference is made to FIG. 6, which schematically illustrates the horizon 302 and fault 304 networks of FIG. 3 transformed to horizon 602 and fault 604 networks in a past depositional geological time configuration 601 in accordance with an embodiment of the invention. A conversion or transformation 606 $\phi$ (e.g., UVT transformation 100 of FIG. 2) may be applied to map the current horizon 302 and fault 304 networks to past depositional horizon 602 and fault 604 networks representing the geological structures as they appeared in their past depositional geological space 601 (e.g., (u,v,t)-space 102 of FIG. 2). In the past model, each horizon 602 may be represented as an iso-surface in the time dimension (e.g., since each horizon is deposited at approximately the same geological time, e.g., within tens of thousands of years). An inverse conversion or transformation 608 $\phi^{-1}$ (e.g., XYZ transformation 112 of FIG. 2) may be applied to map the past depositional horizon 602 and fault 604 networks to their current horizon 302 and fault 304 locations in a current geological space 301 (e.g., (x,y,z)-space 114 of FIG. 2).

Figure 7:
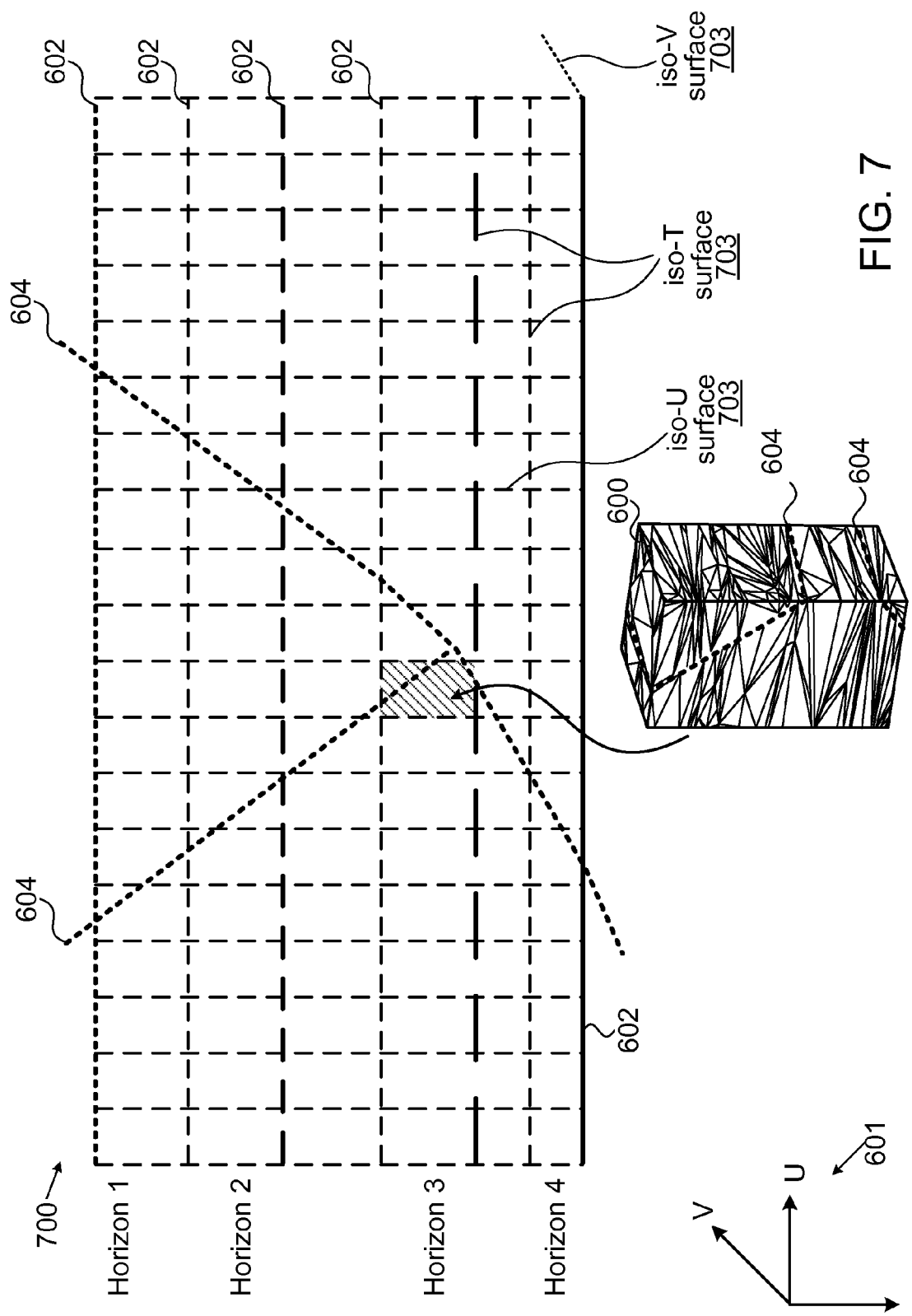
FIG. 7 is a schematic illustration of a past depositional model of the horizon and fault network of FIG. 6 in accordance with an embodiment of the invention.

Reference is made to FIG. 7, which schematically illustrates a past depositional model 700 of horizon 602 and fault 604 networks of FIG. 6 in accordance with an embodiment of the invention. Depositional model 700 may be divided into a plurality of sub-meshes 600 along the surfaces of perpendicular sets of iso-surfaces 703 (e.g., iso u, v and t surfaces). Horizon 602, each having a single or iso-value in the geological time dimension, are inherently modeled by iso t-surfaces. Faults 604, which did not exist during past depositional times, may be superimposed in depositional model 700, e.g., at positions converted or transformed from their current model positions, to sub-meshes 600. Dividing model 700 by fault 604 network may generate some sub-meshes 600 that are uncut and form a single regular polyhedron sub-mesh part 610 and other sub-meshes 600 that are cut by faults 604 to form multiple irregular polyhedron sub-mesh part 610 having at least a facet approximating the surface of the fault. Although sub-meshes 600 are structured (indexed (i,j,k)), sub-mesh parts 610 within each sub-mesh may be unstructured. Accordingly, to simplify model 700, each sub-mesh part 610 may be indexed, e.g., as described in reference to FIG. 8, and represented by a simple polyhedron, e.g., as described in reference to FIG. 9.

Figure 8:
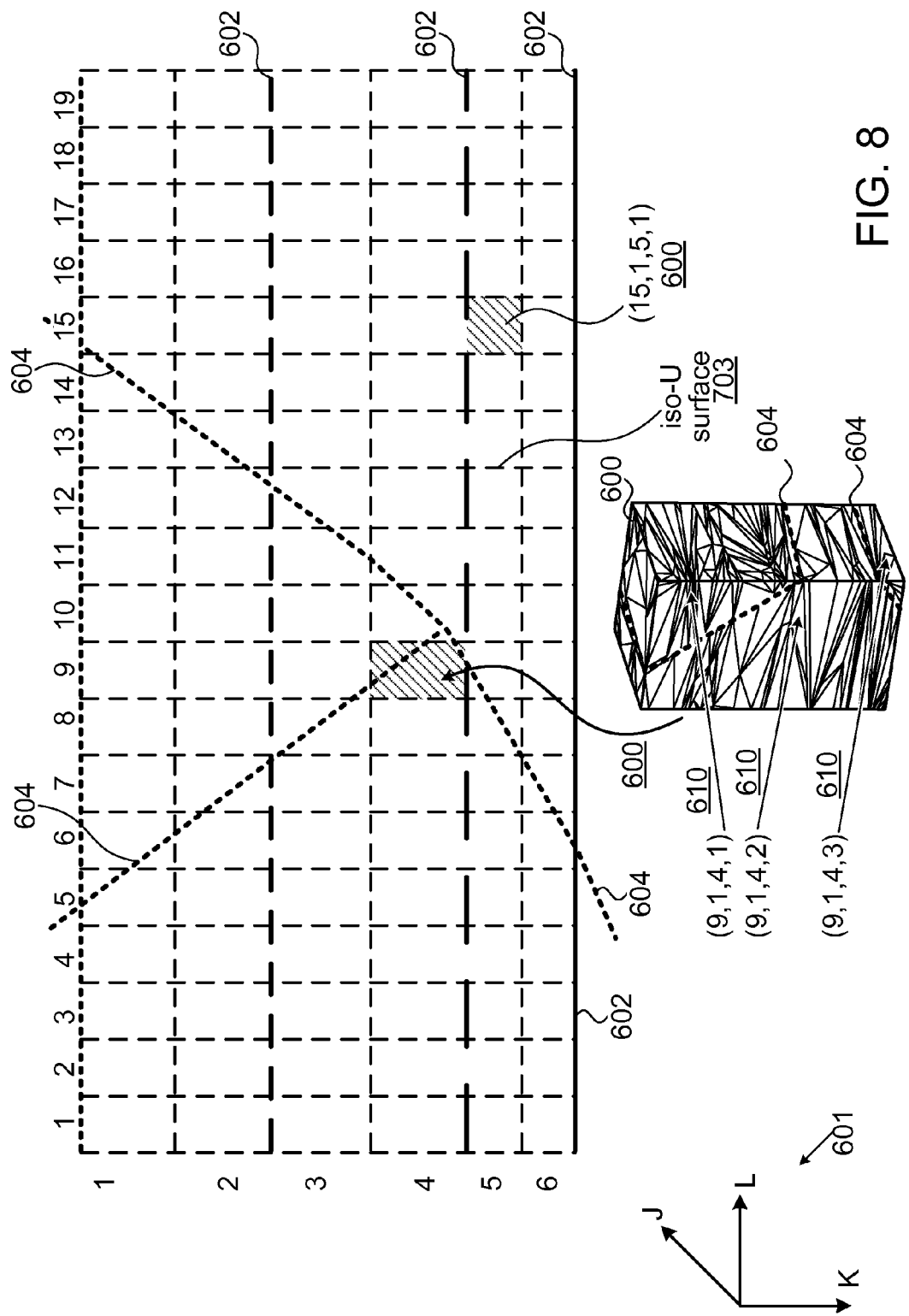
FIG. 8 is a schematic illustration of sub-mesh parts indexed in the past depositional model of FIG. 7 in accordance with an embodiment of the invention.

Reference is made to FIG. 8, which schematically illustrates sub-mesh parts 610 indexed in the past depositional model 700 in accordance with an embodiment of the invention. To organize the fracturing of faults 604, each sub-mesh part 610 may be indexed. Sub-mesh parts 610 may be indexed or counted, e.g., according to the order of sub-mesh part 610 within its sub-mesh 600. For example, a counter may count sub-mesh parts 610 row by row, incrementing the count by 1 each time a fault 604 is crossed. This sub-mesh part index (p) may be used to create a structured index (i,j,k,p) uniquely identifying each sub-mesh part 610.

Figure 9:
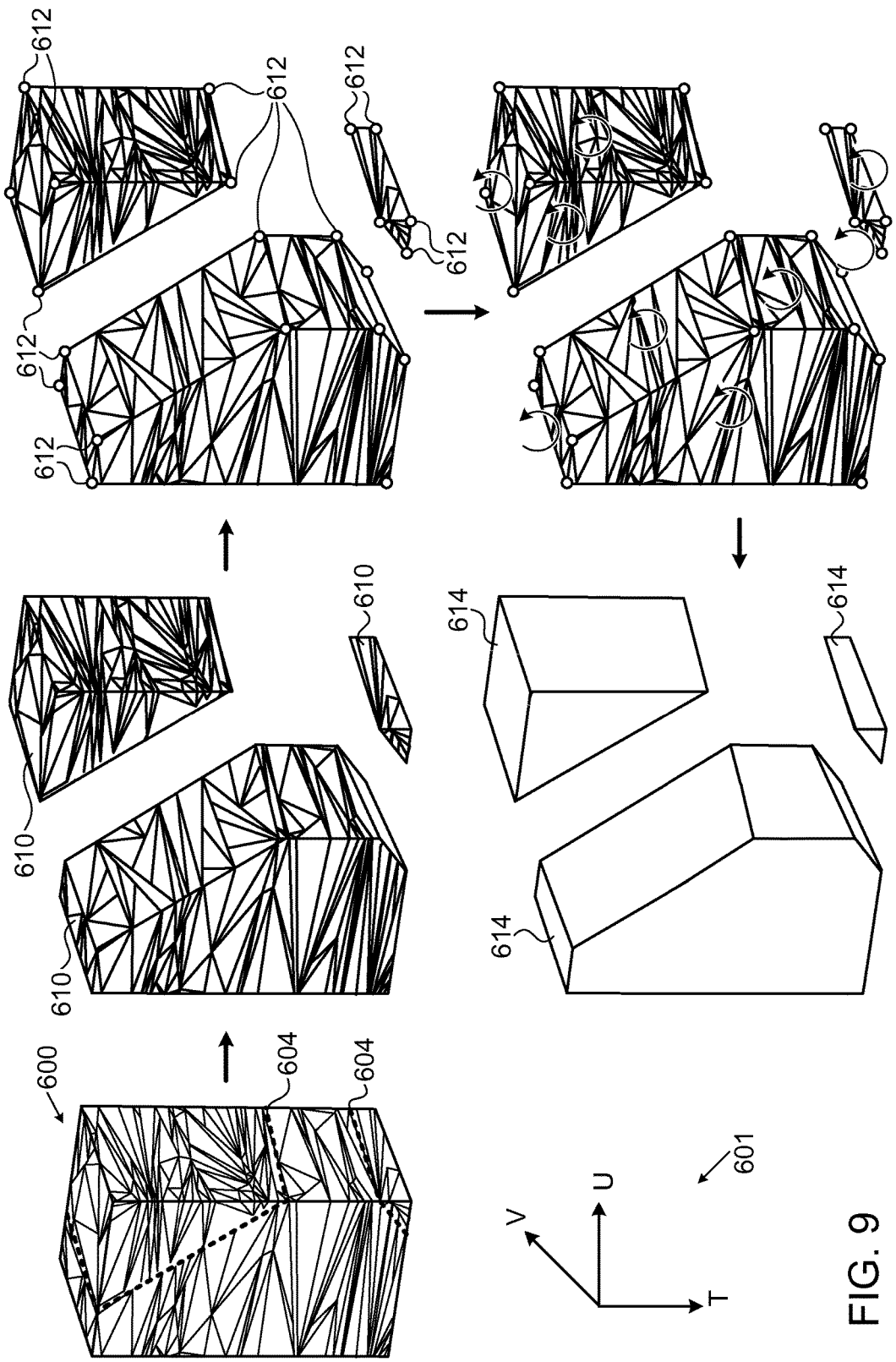
FIG. 9 is a schematic illustration of polyhedrons generated from sub-mesh parts of FIG. 8 in accordance with an embodiment of the invention.

Reference is made to FIG. 9, which schematically illustrates polyhedrons 614 generated from sub-mesh parts 610 of FIG. 8 in accordance with an embodiment of the invention. Polyhedron 614 may be generated for each sub-mesh part 610 by identifying vertices 612, e.g., corner points that intersect three or more surfaces such as a combination of faults and/or iso-surfaces. Each face of a polyhedron 614 may correspond to a single fault or iso-surface. A polygon may be formed by connecting, e.g., in a particular order, all the identified vertices 612 on the fault or iso-surface. Polygons 612 may be combined into a single polyhedron 614.

Figure 10:
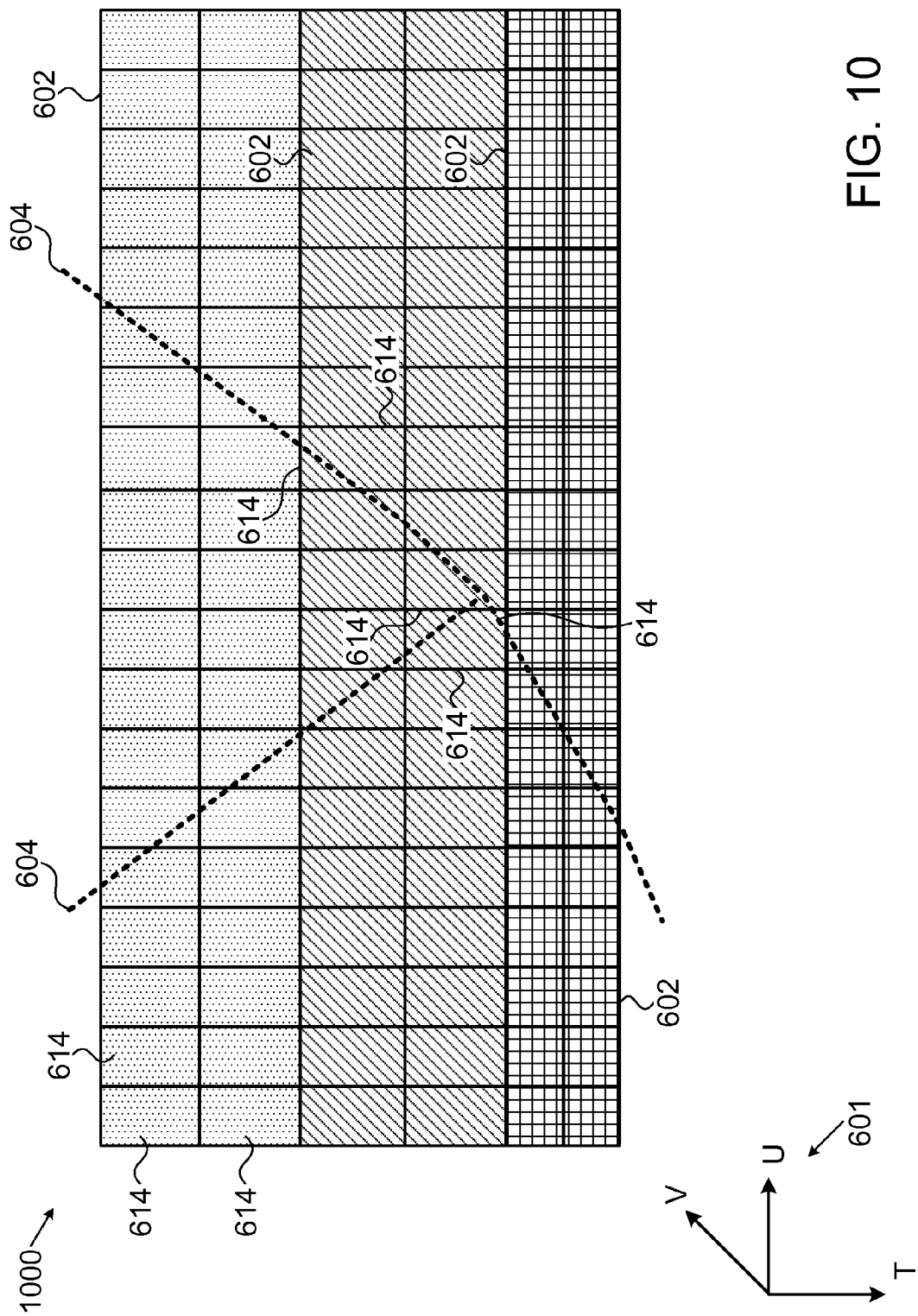
FIG. 10 is a schematic illustration of a depositional model divided into polyhedron sub-mesh parts of FIG. 9 in accordance with an embodiment of the invention.

Reference is made to FIG. 10, which schematically illustrates a depositional model 1000 divided into polyhedron sub-mesh parts 614 of FIG. 9 in accordance with an embodiment of the invention. Sub-meshes 600 intersected by faults 604 divide along the fault surface into two or more polyhedron parts 614 (e.g., creating new vertices 612 and faces along the fault surface), while sub-meshes 600 that are not intersected by faults 604 remain undivided as single regular polyhedron (e.g., hexahedral) sub-mesh parts 614. FIG. 10 depicts a partial front view showing two-dimensions (U,T) of a three dimensional model (U,V,T).

Figure 11:
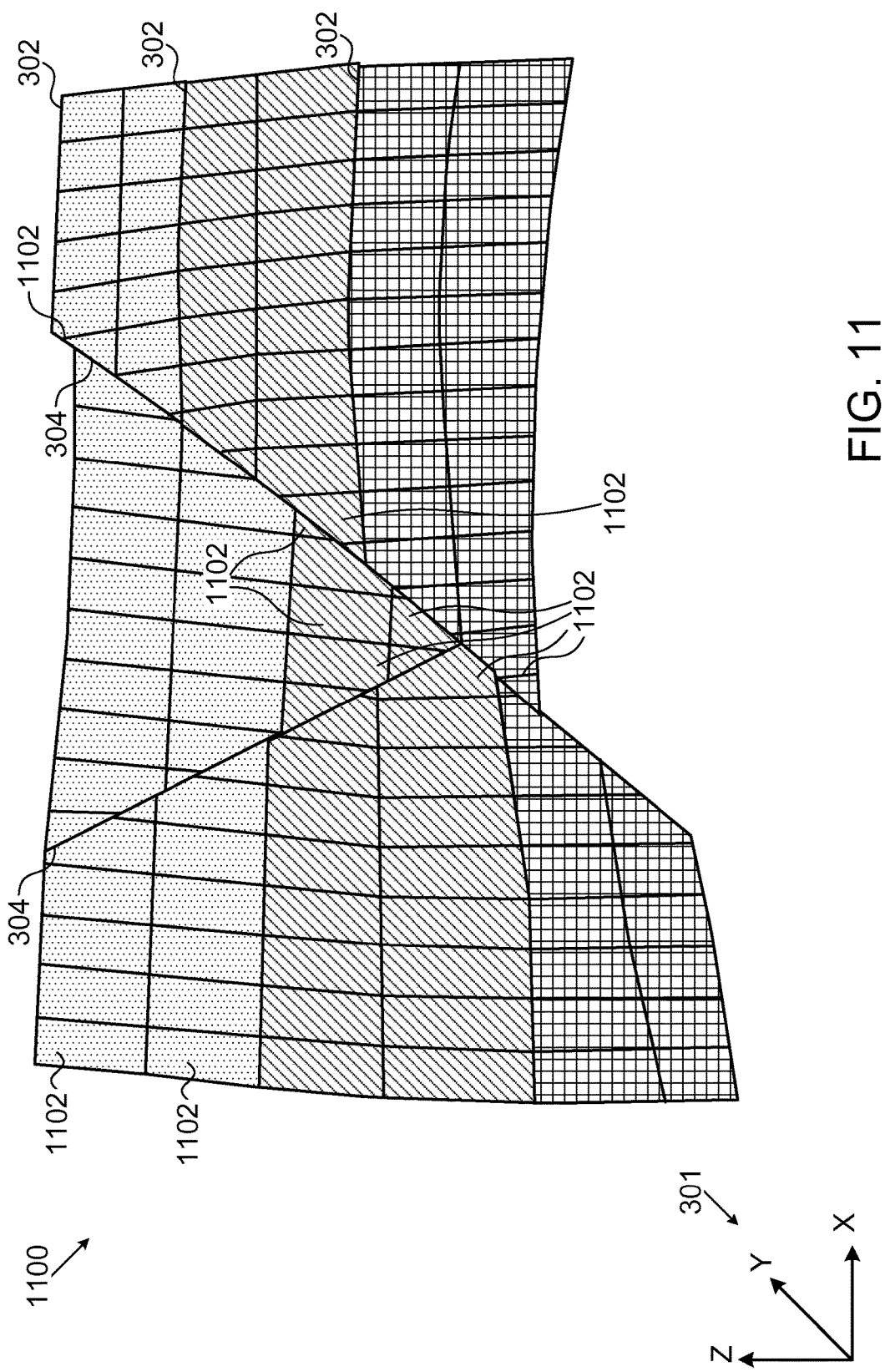
FIG. 11 is a schematic illustration of a current model generated by inverse transforming past depositional model of FIG. 10 in accordance with an embodiment of the invention.

Reference is made to FIG. 11, which schematically illustrates a current model 1100 generated by inverse converting or transforming past depositional model 1000 of FIG. 10 in accordance with an embodiment of the invention. Polyhedron sub-mesh parts 614 of past depositional model 1000 may be inverse transformed (e.g., by inverse transform 112 of FIG. 2) to generate polyhedron sub-mesh parts 1102 of current model 1100. Although the inverse transform may expand, compress, bend, stretch, slide or contort sub-mesh parts 610, the inverse transform generally preserves the polyhedron type (e.g., numbers of sides and shapes) and the polyhedron part order (e.g., defined by part index (p)). Accordingly, as in past depositional model 1000, sub-meshes of current model 1100 intersected by faults 304 divide along the fault surface into two or more polyhedron sub-mesh parts 1102, while sub-meshes that are not intersected by faults 304 remain undivided as single regular polyhedron (e.g., hexahedral) parts 1102. FIG. 11 depicts a partial front view showing two-dimensions (X,Z) of a three dimensional model (X,Y,Z).

Figure 12:
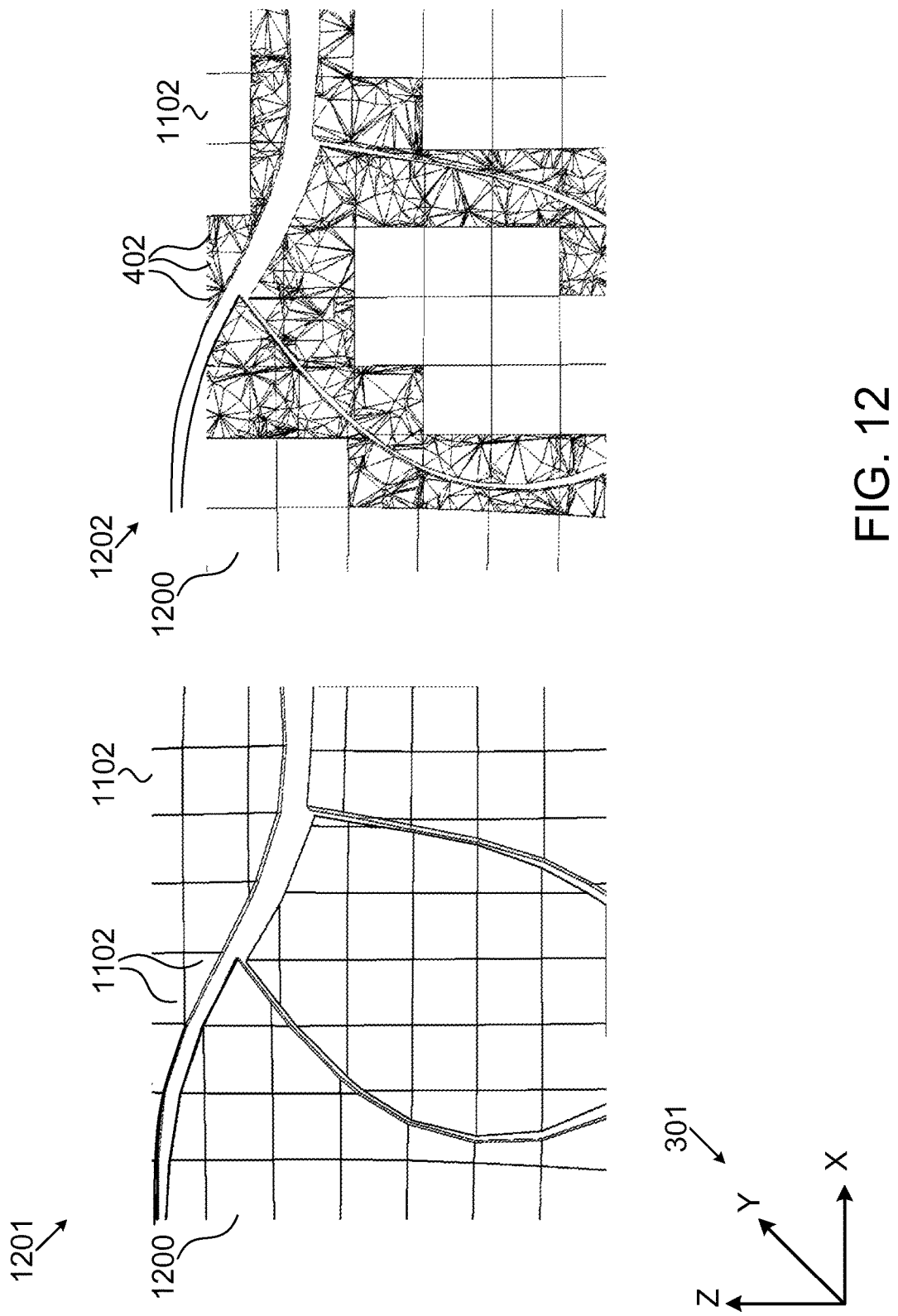
FIG. 12 is a schematic illustration of a polyhedron representation and a cell representation of a current model in accordance with an embodiment of the invention.

Reference is made to FIG. 12, which schematically illustrates a polyhedron representation 1201 of a current model 1200 representing each sub-mesh part by a single polyhedron 1102 and a cell representation 1202 along faults 304 of current model 1200 representing each sub-mesh part by a plurality of cells 402 in accordance with an embodiment of the invention. Cell representation 1202 may provide a relatively more detailed or "close-up" image and/or associated geometric data of model 1200 showing cells 402 of which model 1200 is composed, but polyhedron representation 1201 may be relatively faster to use and edit model 1200 and may use relatively less memory space. In some embodiments, a user may toggle back and forth (e.g., using input device 165 of FIG. 1) between the different representations 1201 and 1202 of model 1200 for display and/or computations and may select specific sub-mesh parts or regions of model 1200 to display and/or compute data in each representation. For example, a user may click or otherwise select one or more sub-mesh parts in polyhedron representation 1201 to transform the sub-mesh parts to the close-up cell representation 1202. In one example, polyhedron representation 1202 may be used for displaying model 1200 (e.g., for relatively fast visualizations) and while cell representation 1201 may be used for processing or computing data using model 1200 (e.g., for relatively more accurate or exact computations). In other embodiments, both representations 1201 and 1202 may be displayed, used and/or edited simultaneously, e.g., in adjacent windows on one or more monitor (e.g., display(s) 180 of FIG. 1). In some embodiments, a user may only edit model 1200 in one of the representations, e.g., cell representation 1202.

Figure 13:
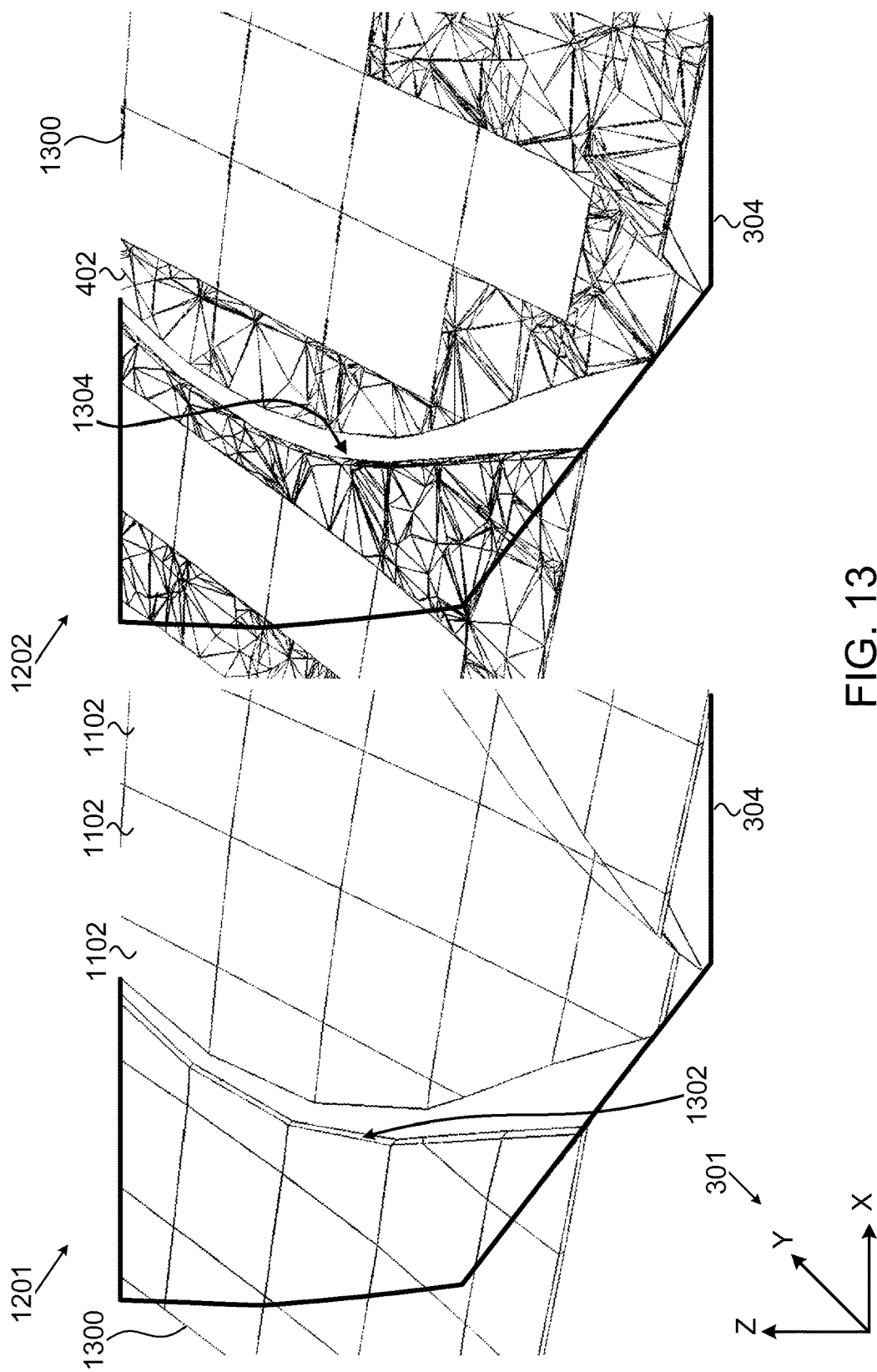
FIG. 13 is a schematic illustration of a polyhedron representation and a cell representation along a curved edge approximating a fault in a current model in accordance with an embodiment of the invention.

Reference is made to FIG. 13, which schematically illustrates a polyhedron representation 1201 and a cell representation 1202 along a curved edge approximating a fault 304 in a current model 1300 in accordance with an embodiment of the invention. In the relatively lower-resolution polyhedron representation 1201, the curved edge may be approximated as a straight edge by a single planar surface or face 1302 for each sub-mesh part 1102. In the relatively higher-resolution cell representation 1202, the curved edge may be approximated by a plurality of planar faces 1304 of a plurality of cells 402 for each sub-mesh part 1102. Cell representation 1202 using the plurality of planar faces 1304 may approximate a curved edge segment with better accuracy, but using greater memory space and computational effort slowing displaying and processing operations, as compared with the single planar surface approximating the same curved edge segment in polyhedron representation 1201.

Figure 14:
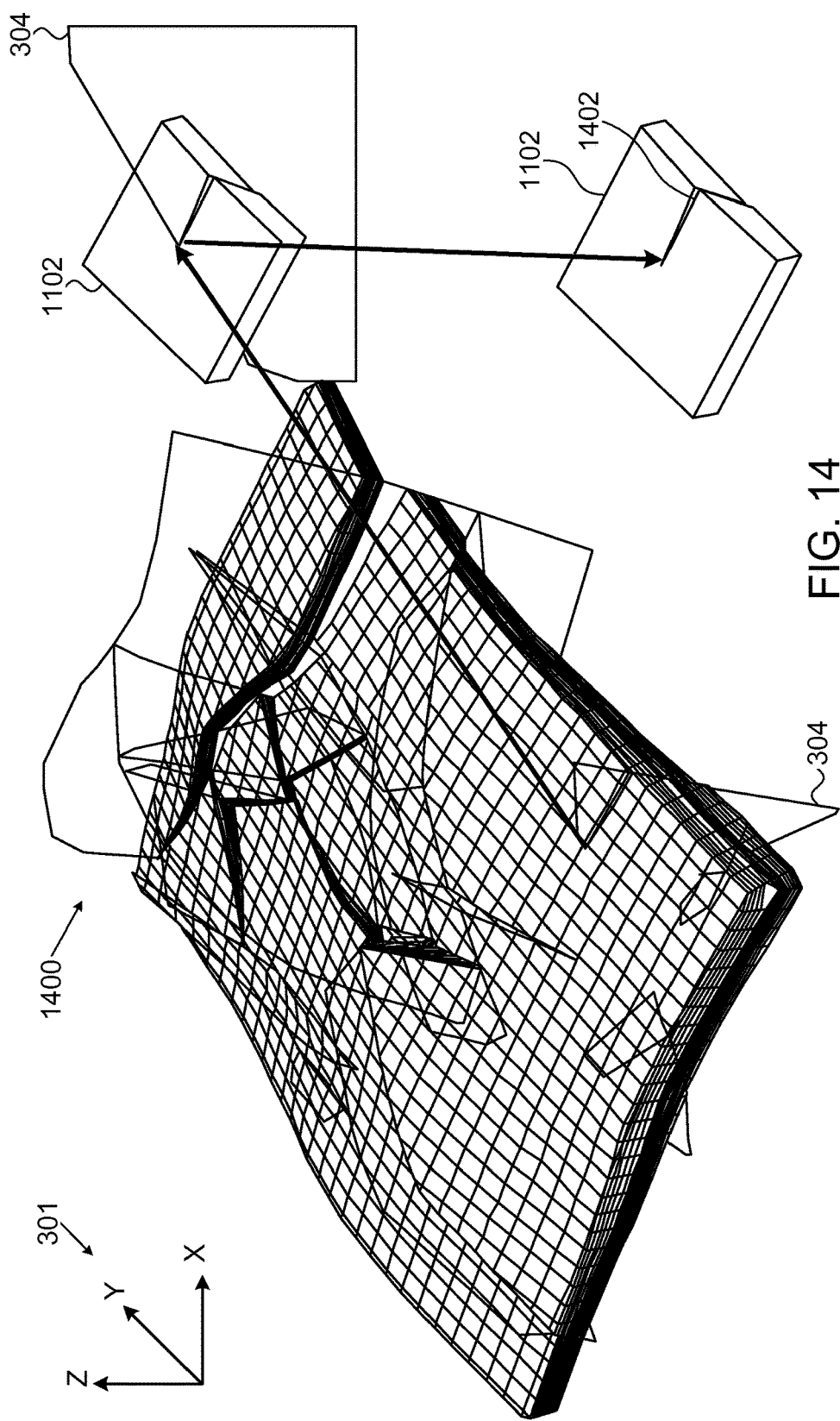
FIG. 14 is a schematic illustration of an example model having a concave vertex in accordance with an embodiment of the invention.

Reference is made to FIG. 14, which schematically illustrates an example model 1400 having a concave vertex 1402 in accordance with an embodiment of the invention. Concave vertex 1402 may include any vertex that is cut or created along fault boundaries 304 and located interior to sub-mesh 1102 relative to an outer edge or face intersected by fault 304. Concave vertex 1402 may include, for example, partial cuts by faults 304 (e.g., where faults 304 do not completely pass through sub-mesh 1102, but ends within sub-mesh 1102, referred to as "dying faults").

Figure 15:
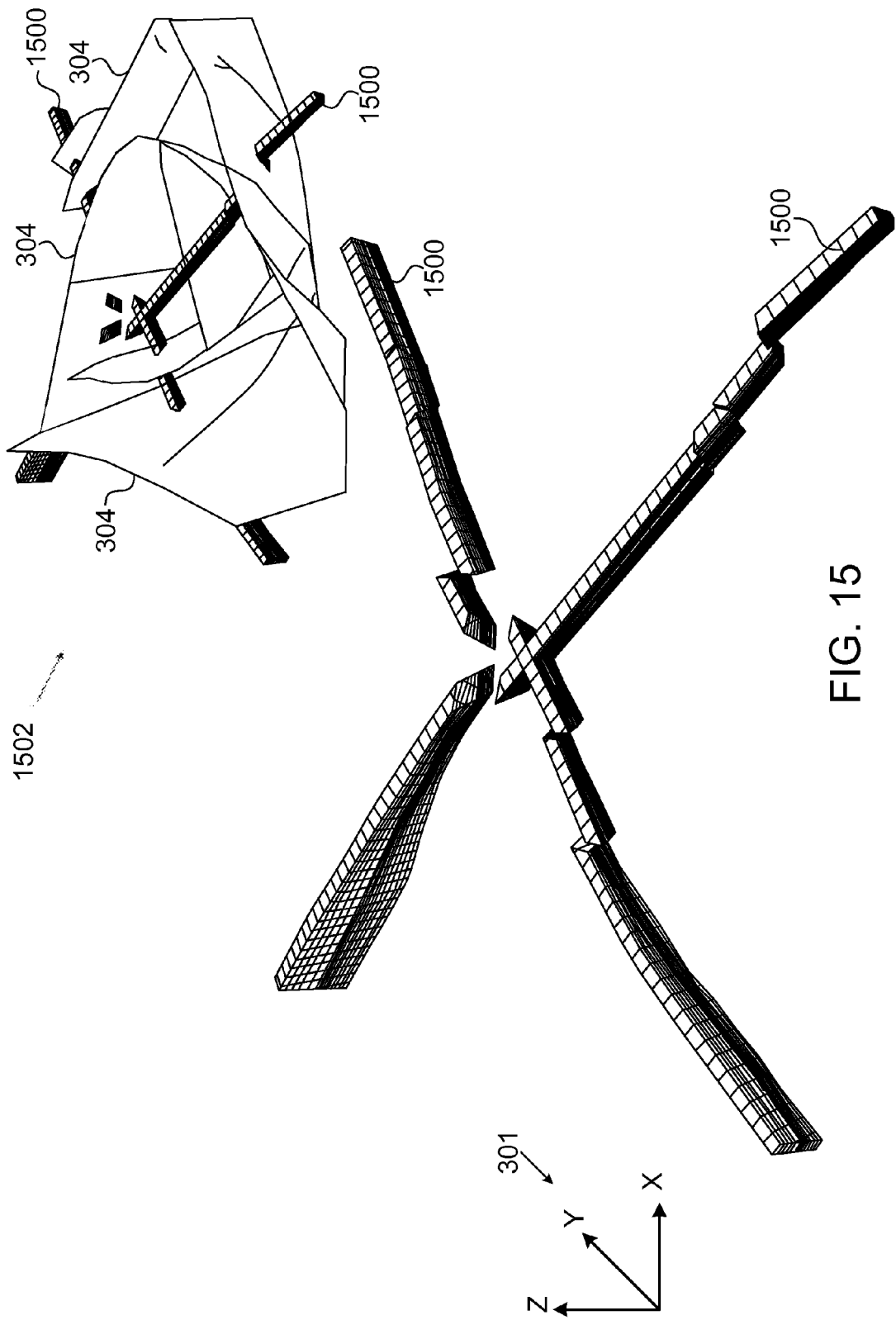
FIG. 15 is a schematic illustration of an example model imaging a complex fault network in accordance with an embodiment of the invention.

Reference is made to FIG. 15, which schematically illustrates an example model 1500 imaging a complex fault network 1502 in accordance with an embodiment of the invention. Model 1500 may accurately image subsurface structures divided by fault network 1502 that includes faults 304 with arbitrarily complicated geometries.

Figure 16:
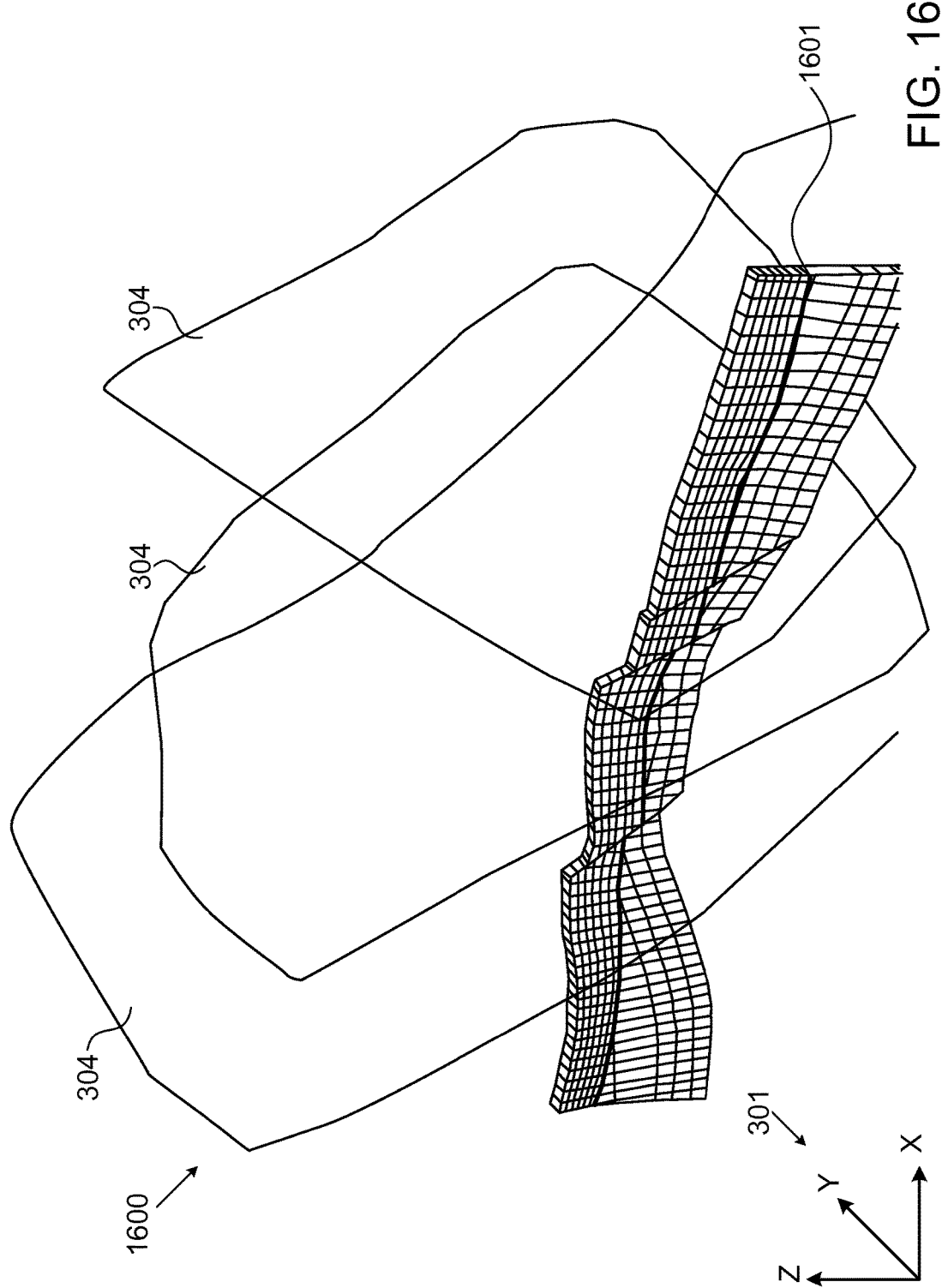
FIG. 16 is a schematic illustration of an example model imaging eroded geological structures in accordance with an embodiment of the invention.

Reference is made to FIG. 16, which schematically illustrates an example model 1600 imaging eroded geological structures in accordance with an embodiment of the invention. Model 1600 may include an erosion surface 1601, which may be a type of unconformity, that divides sub-meshes similarly to fault surfaces 304.

Figure 17:
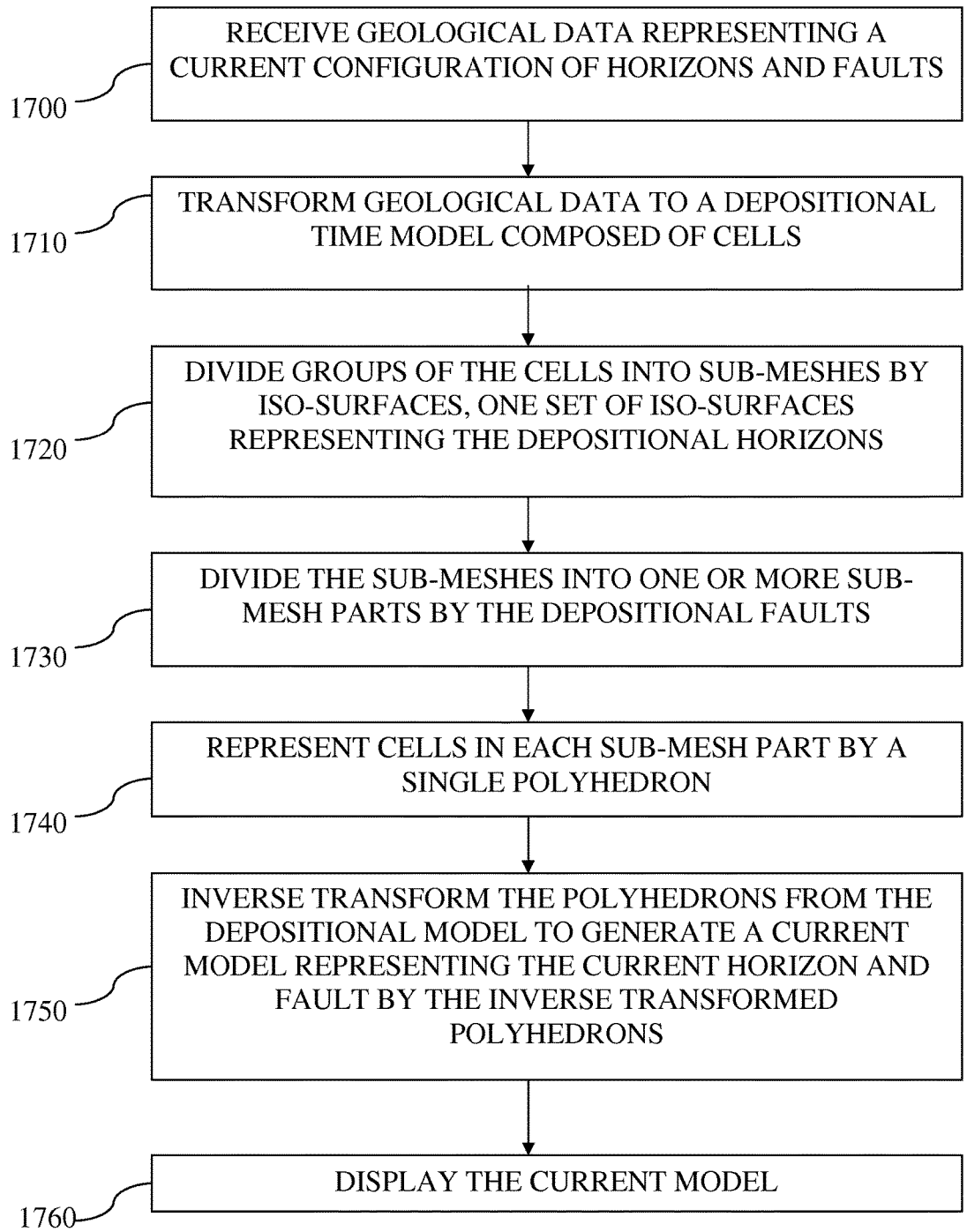
FIG. 17 is a schematic illustration of a method in accordance with an embodiment of the invention.

Reference is made to FIG. 17, which is a flowchart of a method in accordance with an embodiment of the invention. Operations 1700-1750 may be executed using devices and components of the system of FIG. 1, for example, processor 140 may execute operations 1700-1740 and display 180 may execute operation 1750, although other devices and systems may be used to execute these operations.

In operation 1700, geological data may be received representing a current configuration of horizons and faults (e.g., horizons 302 and faults 304 in current geological space 301 of FIG. 3). For example, the data may be generated by devices such as transmitter 190 and receiver 120 of FIG. 1.

In operation 1710, the geological data may be transformed to a depositional model composed of cells representing an estimated configuration of subsurface structure at a depositional time period when the subsurface structure was originally formed. The transformation (e.g., transformation 606 of FIG. 6) may map non-planar horizon iso-surfaces (e.g., horizons 302 of FIG. 6) to planar horizon iso-surfaces (e.g., horizons 602 of FIG. 6) in the depositional model. It may be noted that although horizons exist at the depositional time, faults are typically formed later. However the faults (e.g., faults 604 of FIG. 6) may be modeled in a depositional time configuration at points determined to later form faults (e.g., mapped by the inverse transformation to fault points).

In operation 1720, groups of cells in the depositional model may be divided into a plurality of sub-meshes by iso-surfaces. For example, in a 3D model, three normal sets of iso-surfaces (u,v, and t) divide cells into hexahedral sub-meshes. One set of the iso-surfaces (e.g., iso t-surfaces) may represent the horizons (e.g., as planar surfaces). The sub-meshes may be indexed in a structured grid, each uniquely indexed by dimensional coordinates, e.g., 3D coordinates (i,j,k) in a 3D model. In one embodiment, the iso-surfaces are co-normal (mutually normal to each other) or have equal angles between each set, generating regular polyhedron (e.g., having equal angles between faces and edges).

In operation 1730, the plurality of sub-meshes in the depositional model may be divided into one or more parts or portions by the faults in the second model. Sub-meshes may be divided along the fault surfaces (in 3D) or lines (in 2D) by creating collocated pairs of faces (in 3D) or edges (in 2D) on both sides of the fault that approximate the orientation of the fault surfaces or lines.

In operation 1740, the cells in each sub-mesh part may be converted to or represented by a single polyhedron. If a fault does not intersect a sub-mesh, the sub-mesh cells may be represented by one polyhedron sub-mesh part and if a fault does intersect a sub-mesh, the sub-mesh cells may be represented by a plurality of sub-mesh parts each having at least a facet approximating the orientation of the fault surface. For example, if a fault does not intersect a sub-mesh, the cells in the sub-mesh may be represented by a single regular polyhedron and if a fault does intersect a sub-mesh, the cells in the sub-mesh may be represented by a plurality of irregular polyhedrons.

The polyhedron representing cells in each sub-mesh part may be generated by identifying vertices that intersect at least N surfaces (including any combination of faults and/or iso-surfaces) in an N dimensional model and generating a polyhedron defined by the identified vertices. The sub-mesh parts, which have an unstructured grid geometry (e.g., tetrahedral), are structured by indexing or identifying them using the structured grid index of the sub-mesh from which they are divided and an additional index identifying the part within the sub-mesh. For example, in a 3D current or depositional model, each sub-mesh part may be indexed, labeled or identified with a unique index or identifier such as (i,j,k,p), where the first three coordinates (i,j,k) uniquely index the sub-mesh from which the part is divided and the fourth coordinate (p) uniquely indexes the pth part in the sub-mesh (i,j,k).

In operation 1750, the polyhedron sub-mesh parts from the depositional model (e.g., polyhedron sub-mesh parts 614 of FIG. 10) may be inverse transformed to generate a current model to represent the current configuration of the faults and horizons using inverse transformed polyhedron sub-mesh parts (e.g., polyhedron sub-mesh parts 1102 of FIG. 11).

In operation 1760, the current model (e.g., model 1100 of FIG. 11) may be displayed. The current model may be displayed using a polyhedron representation (e.g., polyhedron representation 1201 of FIG. 12) to visualize the inverse transformed polyhedron sub-mesh parts and/or a cell representation (e.g., cell representation 1202 of FIG. 12) to visualize the cells within the inverse transformed polyhedron sub-mesh parts. The model data, geometric computations, and display of the model may switch between the polyhedron representation and the cell representation of the current model, for example, upon receipt of a user-generated command (e.g., via input device 165 of FIG. 1). In one embodiment, the polyhedron information to display the sub-mesh parts as polyhedrons may be stored (e.g., in local memory 145 of FIG. 1) separately from the cell information (e.g., in memory 150 of FIG. 1). The display may additionally or alternatively display the second model. In some embodiments, the current and depositional models may be displayed simultaneously in adjacent windows for comparison.

Other or additional operations may be used.

Embodiments of the invention may include an article such as a computer or processor readable non-transitory storage medium, such as for example a memory, a disk drive, or a USB flash memory encoding, including or storing instructions, e.g., computer-executable instructions (e.g., such as software 160 of FIG. 1), which when executed by a processor or controller (e.g., such as processor 140 of FIG. 1), cause the processor or controller to carry out methods disclosed herein.

Computer-executable instructions or software code for generating a polyhedron mesh (e.g., which is a conform and hexahedron-dominant mesh) may include, for example (other code may be used):

```
-- Initialize an empty polyhedron mesh M, that contains:
   V, a container of polyhedron mesh vertices
   F, a container of polyhedron mesh faces (e.g. polygons)
   C, a container of polyhedron mesh sub-meshes (e.g., polyhedrons)
FOR each cell of the decomposition
   FOR each sub-mesh part
      Initialize n boundary cell containers, where a boundary is either
      a fault or an iso-surface (U or V or T)
      FOR each cell in the sub-mesh part
         FOR each of the faces of the cell
            IF (the face is on a boundary)
               Store the face in the container corresponding to the
               boundary
            END IF
         END FOR
      END FOR
      Initialize a local container of polyhedron mesh faces F_local
      FOR each of the n boundary cell face containers
         Initialize a local container of polyhedron mesh vertices V_local
         FOR each face in the container
            FOR each of the 3 vertices
               IF (the vertex is simultaneously on any 3 of the n
               boundaries)
                  IF ( it exists already a polyhedron mesh
                  vertex in V being on the same 3 boundaries)
                     Store a copy of this polyhedron mesh
                     vertex in V_local
                  ELSE
                     Construct in V a polyhedron mesh
                     vertex using the 3 boundaries and
                     store a copy in V_local (merging sub-
                     mesh vertices to form an integrated
                     and/or conform mesh)
                  END IF
               END IF
            END FOR
         END FOR
         Sort the j vertices in V_local in a counter-clockwise order, where j is
         the size V_local
         Construct in F a polyhedron mesh face from the j vertices in the
         sorted order and store a copy in F_local
      END FOR
      Construct in C a polyhedron mesh sub-mesh with the n faces in
F_local.
   END FOR
END FOR
```

Other code, operations or data structures may be used.

In one embodiment, a method may model a subsurface structure. Data representing a configuration of faults and horizons may be converted or transformed to a depositional model comprising cells representing an estimated configuration of subsurface structure at a depositional time period when the subsurface structure was formed. Groups of cells in the depositional model may be divided into sub-meshes using iso-surfaces, one set of iso-surfaces representing the horizons at the depositional time period. The sub-meshes may be divided into one or more parts using the transformed geological data representing an estimated depositional configuration of the faults. For each group of cells in each sub-mesh part, the group of cells in the sub-mesh part may be represented by a single polyhedron. The polyhedrons may be converted or transformed to generate a current model to represent the current configuration of the faults and horizons using converted polyhedrons.

Embodiments of the invention may manipulate data representations of real-world objects and entities such as underground geological features, including faults, horizons and other features. Data received by for example a receiver receiving waves generated by an air gun or explosives may be manipulated and stored, e.g., in memory 150, and data such as images representing underground features may be presented to a user, e.g., as a visualization on display 180.

When used herein, cells may refer to basic units of modeling or smallest components of a mesh. Cells are typically tetrahedral in 3D models and triangular in 2D models, although other polyhedron or polygon shapes may be used for cells, such as, hexahedrons, prisms, pyramids, or general polyhedrons in 3D models or quadrilaterals, pentagons or general polygons in 2D models. When used herein, sub-meshes may refer to a plurality of cells grouped or divided by boundary iso-surfaces (in 3D models) or iso-lines (in 2D models). Sub-meshes are typically hexahedral in 3D models and quadrilateral in 2D models, although other polyhedron or polygon shapes may be used for cells, such as, tetrahedrons, prisms, pyramids, or general polyhedrons in 3D models or triangles, pentagons or general polygons in 2D models.

When used herein, faults may include faults, unconformities, eroded surfaces (a form of unconformities) (e.g., surface 1601 of FIG. 16) and, where each such surface may be treated as a fault surface, e.g., where sub-meshes intersected by each such surface may be divided into a plurality of sub-mesh parts.

When used herein, geological features such as horizons and faults may refer to the actual geological feature existing in the real world, or to computer data representing such features (e.g., stored in a memory or mass storage device). Some features when represented in a computing device may be approximations or estimates of a real world feature, or a virtual or idealized feature, such as an idealized horizon as produced in a uvt-transform. A model, or a model representing subsurface features or the location of those features, is typically an estimate or a "model", which may approximate or estimate the physical subsurface structure being modeled with more or less accuracy.

Different embodiments are disclosed herein. Features of certain embodiments may be combined with features of other embodiments; thus certain embodiments may be combinations of features of multiple embodiments.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for modeling a subsurface structure including faults and horizons, the method comprising:
   by one or more computer processors:
   receiving geological data representing a current configuration of the faults and horizons, wherein said data is produced in a three-dimensional field by a transmitter emitting compression waves that reflect at geological discontinuities throughout the subsurface structure and a receiver receiving the reflected compression waves that correspond to the compression waves output by the transmitter;
   transforming the geological data to a depositional model comprising cells representing an estimated configuration of the horizons at a depositional time period when the subsurface structure was originally formed and superimposing an estimated depositional configuration of the faults in the depositional model that are not iso-surfaces of the depositional model;
   dividing groups of cells in the depositional model into a plurality of sub-meshes by iso-surfaces of the depositional model, one set of iso-surfaces representing the horizons at the depositional time period;
   further dividing one or more of the plurality of sub-meshes in the depositional model into a plurality of sub-mesh parts by the superimposed estimated depositional configuration of the faults;
   representing the cells in each sub-mesh part by a single polyhedron with each facet corresponding to one of the faults or iso-surfaces of the depositional model having a single value for one or more coordinates of the depositional model;
   wherein for one or more of the faults that does not intersect a sub-mesh, the cells of the sub-mesh are represented by a single polyhedron with each facet corresponding to an iso-surface of the depositional model and for one or more of the faults that does intersect a sub-mesh, the cells of the sub-mesh are further divided into a plurality of polyhedrons each having at least a facet approximating the orientation of the fault surface;
   inverse transforming the polyhedrons from the depositional model to generate a current model to represent the current configuration of the faults and horizons using inverse transformed polyhedrons; and
   displaying the current model.

2. The method of claim 1, wherein the current model is represented by a polyhedron representation defining the subsurface structure by the inverse transformed polyhedrons.

3. The method of claim 1, wherein the current model is represented by a cell representation defining the subsurface structure by an inverse transformation of the cells.

4. The method of claim 1 comprising switching between providing a polyhedron representation and a cell representation of the current model upon receipt of a user-generated command.

5. The method of claim 4 comprising storing polyhedron information for the polyhedron representation separately from cell information for the cell representation.

6. The method of claim 4, wherein the current model is displayed using the polyhedron representation and geological properties of the current model are computed using the cell representation.

7. The method of claim 1 comprising generating a polyhedron to represent cells in each sub-mesh part by:
   identifying vertices that intersect at least N surfaces including faults or iso-surfaces in an N dimensional model, and
   generating a polyhedron defined by the identified vertices.

8. The method of claim 1, wherein the sub-meshes are indexed in a structured grid and the sub-mesh parts, which have an unstructured grid geometry and topology, are indexed by an additional index identifying the part within the sub-mesh.

9. The method of claim 1, wherein in a three-dimensional (3D) current or depositional model, each sub-mesh part has a unique index (i,j,k,p), where the first three coordinates (i,j,k) uniquely index the sub-mesh from which the sub-mesh part is divided and the fourth coordinate (p) uniquely indexes the pth part in the sub-mesh (i,j,k).

10. The method of claim 1, wherein the current and depositional models are three-dimensional (3D) and hexahedron sub-meshes are generated in the depositional model by dividing cells by three mutually normal sets of iso-surfaces of the depositional model.

11. The method of claim 1, wherein the transformation maps non-planar horizon iso-surfaces in the current model to planar horizon iso-surfaces in the depositional model.

12. A method for modeling a subsurface structure including faults and horizons, the method comprising:
    by one or more computer processors:
    receiving geological data representing a current configuration of faults and horizons produced in a three-dimensional field by a transmitter emitting compression waves that reflect at geological discontinuities throughout the subsurface structure and a receiver receiving the reflected compression waves that correspond to the compression waves output by the transmitter;
    converting the geological data representing a configuration of the horizons to a depositional model comprising cells representing an estimated configuration of the horizons at a depositional time period when the subsurface structure was formed and superimposing an estimated depositional configuration of the faults in the depositional model that are not iso-surfaces of the depositional model;

dividing groups of cells in the depositional model into sub-meshes using iso-surfaces of the depositional model, one set of iso-surfaces representing the horizons at the depositional time period;

further dividing one or more of the sub-mesh part, representing the group of cells in the sub-mesh part by a single polyhedron with each facet corresponding to the one of the faults or the iso-surface of the depositional model having a single value for one or more coordinates of the depositional model; and converting the polyhedrons to generate a current model to represent the current configuration of the faults and horizons using converted polyhedrons.

13. The method of claim 12, wherein the current model has a conform geometry.

14. The method of claim 12, wherein over half of the sub-mesh parts in the current model are hexahedron sub-mesh parts.

15. A system for modeling a subsurface structure including faults and horizons, the system comprising:

one or more processors to:

receive geological data representing a current configuration of faults and horizons produced in a three-dimensional field by a transmitter emitting compression waves that reflect at geological discontinuities throughout the subsurface structure and a receiver receiving the reflected compression waves that correspond to the compression wave output by the transmitter;

transform data representing a configuration of the horizons to a depositional model comprising cells representing an estimated configuration of the horizons at a depositional time period when the subsurface structure was formed and superimpose an estimated depositional configuration of the faults in the depositional model that are not iso-surfaces of the depositional model, divide groups of cells in the depositional model into sub-meshes using iso-surfaces of the depositional model, one set of iso-surfaces representing the horizons at the depositional time period, further divide one or more of the sub-meshes in the depositional model into a plurality of parts using the superimposed configuration of the faults, for each group of cells in each sub-mesh part, represent the group of cells in the sub-mesh part by a single polyhedron with each facet corresponding to one of the faults or iso-surfaces of the depositional model having a single value for one or more coordinates of the depositional model, and transform the polyhedrons to generate a current model to represent the current configuration of the faults and horizons using transformed polyhedrons; and a display to display the current model.

16. The system of claim 15, wherein the one or more processors represent the current model data using a polyhedron representation to represent the subsurface structure by inverse transformed polyhedrons and a cell representation to represent the subsurface structure by an inverse transformation of the cells.

17. The system of claim 16 comprising an input device, wherein upon receipt of a user-generated command via the input device, the one or more processors switch between providing the polyhedron representation and the cell representation of the current model.

18. The system of claim 16 comprising one or more storage units to separately store polyhedron information for the polyhedron representation and cell information for the cell representation.

19. The system of claim 15, wherein the one or more processors generate a polyhedron to represent cells in each sub-mesh part by identifying vertices that intersect at least N surfaces including faults or iso-surfaces in an N dimensional model and generating a polyhedron defined by the identified vertices.

20. The system of claim 15, wherein the one or more processors index the sub-meshes in a structured grid and indexes the sub-mesh parts, which have an unstructured grid geometry and topology, by an additional index identifying the part within the sub-mesh.

21. The method of claim 1, wherein the subsurface structures are modeled using a semi-structured grid, in which each sub-mesh in the grid is structured and one or more of the sub-mesh parts within one or more of the sub-meshes is unstructured.

22. The method of claim 1, wherein the iso-surfaces of the depositional model comprise one or more set(s) of iso-surfaces that are normal to the horizons and normal to each other.

* * * * *